United States Patent
Yi et al.

(10) Patent No.: US 9,461,766 B2
(45) Date of Patent: Oct. 4, 2016

(54) METHOD AND APPARATUS FOR SETTING REFERENCE SIGNAL

(71) Applicant: LG ELECTRONICS INC., Seoul (KR)

(72) Inventors: Yunjung Yi, Anyang-si (KR); Joonkui Ahn, Anyang-si (KR); Suckchel Yang, Anyang-si (KR); Hanbyul Seo, Anyang-si (KR); Bonghoe Kim, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/383,664

(22) PCT Filed: Mar. 11, 2013

(86) PCT No.: PCT/KR2013/001942
§ 371 (c)(1),
(2) Date: Sep. 8, 2014

(87) PCT Pub. No.: WO2013/133682
PCT Pub. Date: Sep. 12, 2013

(65) Prior Publication Data
US 2015/0016239 A1    Jan. 15, 2015

Related U.S. Application Data

(60) Provisional application No. 61/608,653, filed on Mar. 9, 2012, provisional application No. 61/611,034, filed on Mar. 15, 2012.

(51) Int. Cl.
*H04W 80/04*    (2009.01)
*H04W 56/00*    (2009.01)
*H04J 11/00*    (2006.01)
*H04L 5/00*    (2006.01)
*H04J 13/18*    (2011.01)
*H04L 27/26*    (2006.01)

(52) U.S. Cl.
CPC ........... *H04J 11/005* (2013.01); *H04J 11/003* (2013.01); *H04J 11/0079* (2013.01); *H04J 11/0086* (2013.01); *H04J 13/18* (2013.01); *H04L 5/0048* (2013.01); *H04L 5/0073* (2013.01); *H04L 27/2613* (2013.01); *H04L 5/001* (2013.01); *H04L 5/0035* (2013.01); *H04L 5/0053* (2013.01)

(58) Field of Classification Search
CPC ... H04W 80/04; H04W 72/04; H04W 56/00; H04J 3/065; H04J 3/0655; H04J 3/0638; H04J 3/0685
See application file for complete search history.

(56) References Cited

U.S. PATENT DOCUMENTS

2009/0116470 A1* 5/2009 Berggren .............. H03M 13/33
370/342
2010/0271965 A1  10/2010 Siomina et al.
2010/0272004 A1* 10/2010 Maeda .................. H04L 5/0007
370/312

(Continued)

*Primary Examiner* — Andrew Lee
(74) *Attorney, Agent, or Firm* — Birch, Stewart, Kolasch & Birch, LLP

(57) ABSTRACT

Disclosed are a method and an apparatus for setting a reference signal. A wireless apparatus receives a primary synchronization signal (PSS) transmitted by a first orthogonal frequency division multiplexing (OFDM) symbol and a secondary synchronization signal (SSS) from a second OFDM symbol, and can search information for setting a reference signal on the basis of symbol numbers of the first OFDM symbol and the second OFDM symbol. Inter-cell interference can be reduced by means of a variety of methods for setting a reference signal.

11 Claims, 33 Drawing Sheets

(56) References Cited

U.S. PATENT DOCUMENTS

| | | | |
|---|---|---|---|
| 2011/0026648 A1* | 2/2011 | Swarts | H04J 11/0086 375/343 |
| 2011/0085457 A1 | 4/2011 | Chen et al. | |
| 2011/0103534 A1* | 5/2011 | Axmon | H04J 11/0069 375/371 |
| 2011/0247026 A1* | 10/2011 | McWilliams | H04N 21/25435 725/2 |
| 2011/0286406 A1 | 11/2011 | Chen et al. | |
| 2011/0292847 A1 | 12/2011 | Yoon et al. | |
| 2011/0310831 A1 | 12/2011 | Bhattad et al. | |
| 2012/0117135 A1* | 5/2012 | Yoon | H04J 13/102 708/209 |
| 2012/0315948 A1* | 12/2012 | Frenger | H04W 52/0232 455/522 |
| 2013/0083682 A1* | 4/2013 | Ng | H04L 5/0023 370/252 |
| 2013/0089065 A1* | 4/2013 | Koorapaty | H04W 56/001 370/330 |
| 2013/0203419 A1* | 8/2013 | Siomina | H04W 36/18 455/437 |
| 2014/0056165 A1* | 2/2014 | Siomina | H04B 1/7083 370/252 |
| 2014/0247808 A1* | 9/2014 | Zhang | H04L 5/003 370/331 |

* cited by examiner

FIG. 20
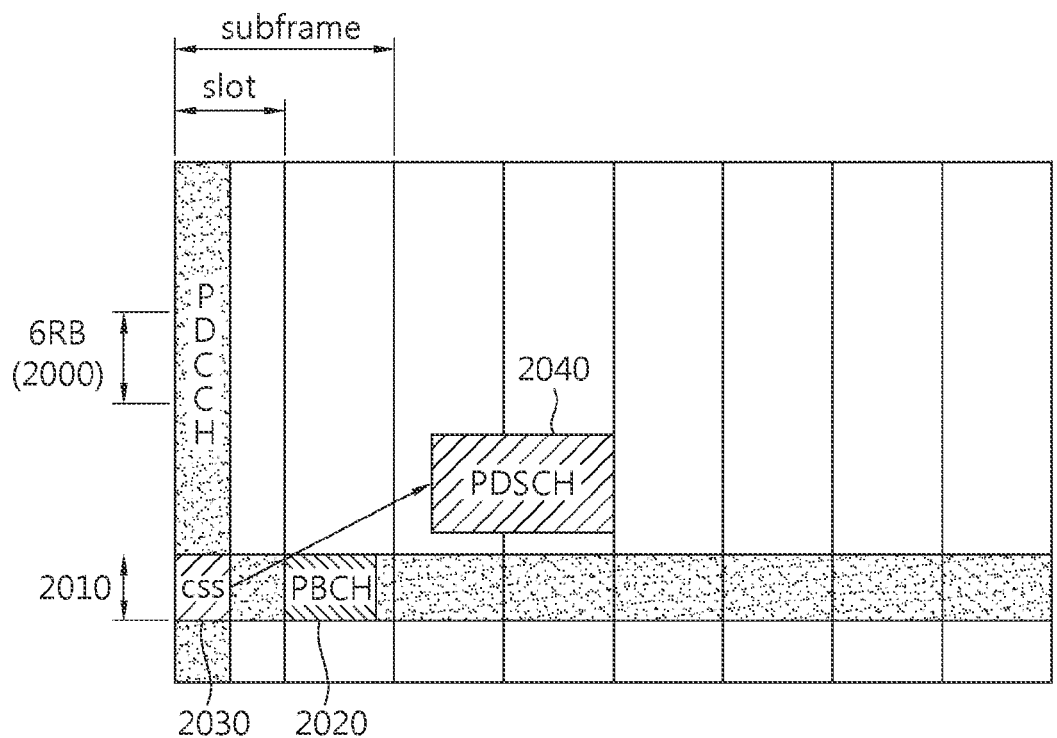
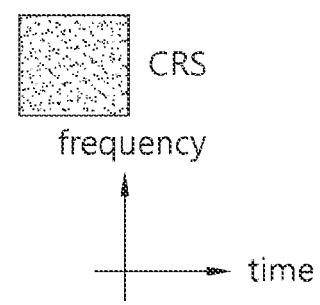

FIG. 23
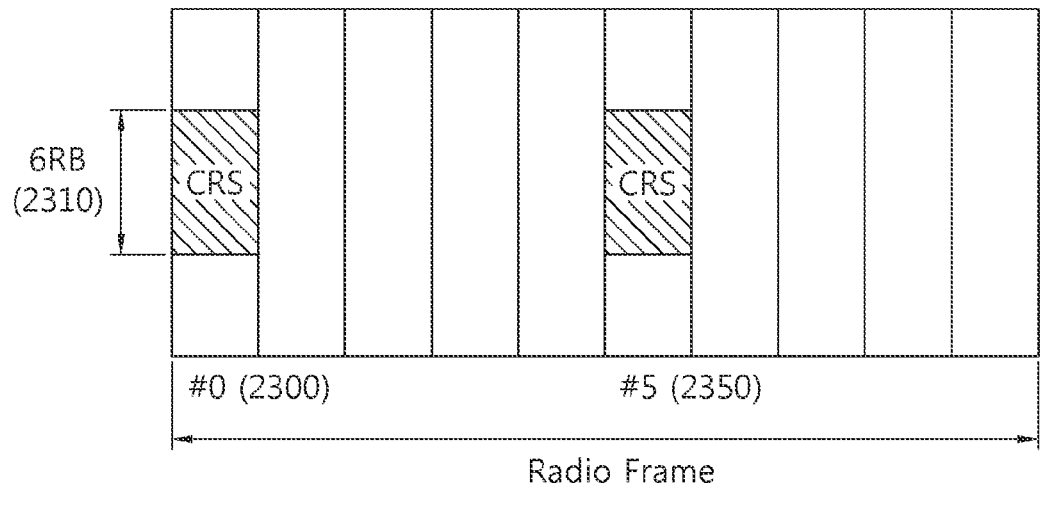
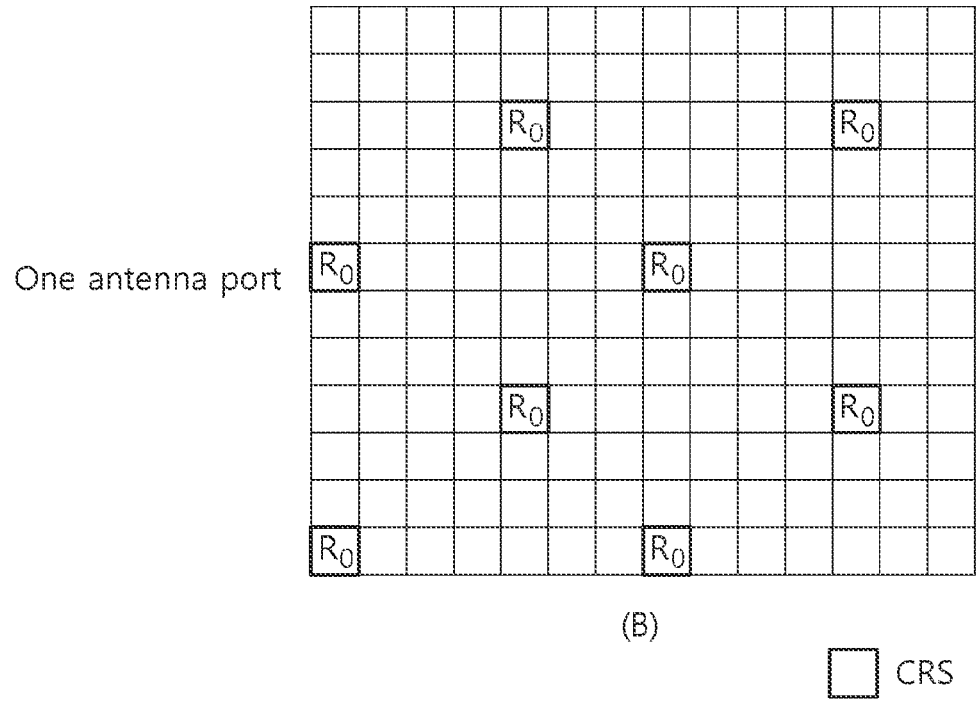

FIG. 31
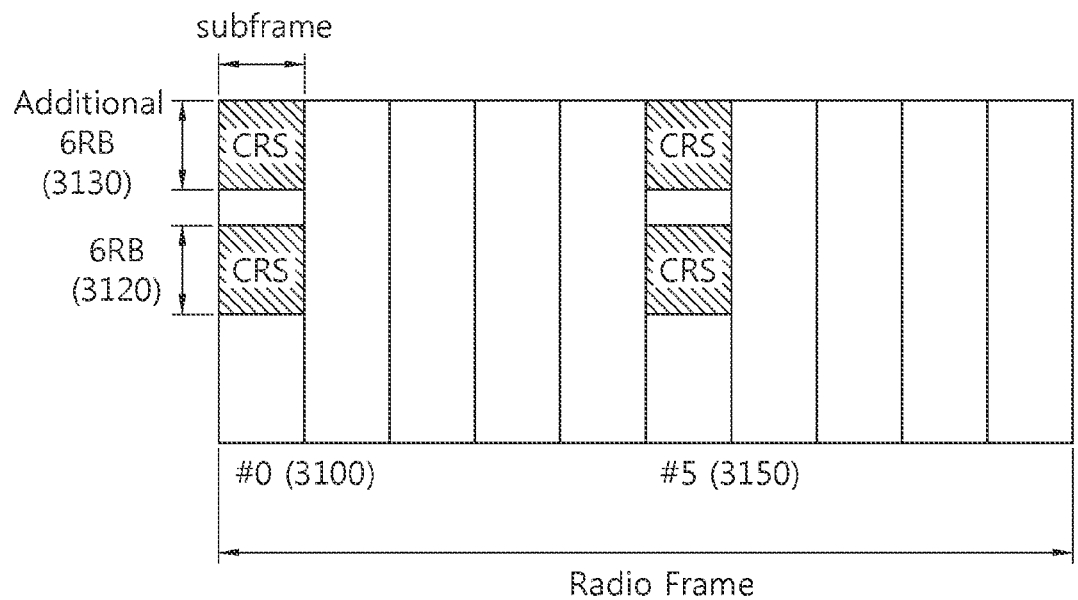
(A)
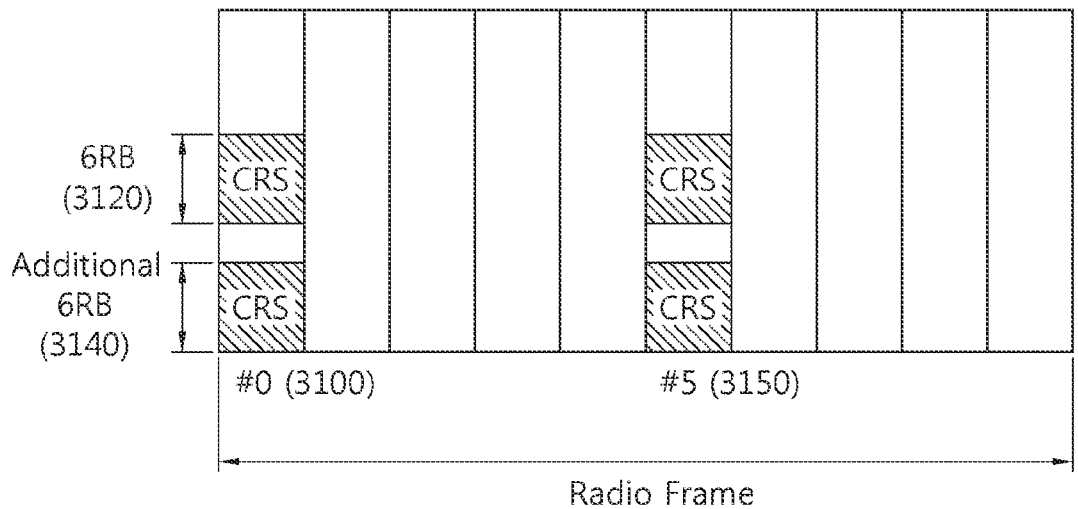
(B)
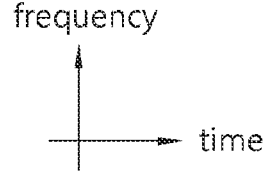

FIG. 32

| ///1/// | ///2/// | 3 | 4 | 5 | 6 | 7 | 8 | 9 | 10 |
|---|---|---|---|---|---|---|---|---|---|
| 1 | 1 | 0 | 0 | 0 | 0 | 0 | 0 | 0 | 0 |

METHOD AND APPARATUS FOR SETTING REFERENCE SIGNAL

CROSS REFERENCE TO RELATED APPLICATIONS

This application is the National Phase of PCT International Application No. PCT/KR2013/001942, filed on Mar. 11, 2013, which claims priority under 35 U.S.C. 119(e) to U.S. Provisional Application No. 61/608,653, filed on Mar. 9, 2012, and U.S. Provisional Application No. 61/611,034, filed on Mar. 15, 2012, all of which are hereby expressly incorporated by reference into the present application.

BACKGROUND OF THE INVENTION

1. Field of the Invention

The present invention relates to wireless communication and, more particularly, to a method and apparatus for configuring a reference signal.

2. Related Art

In the Long Term Evolution (LTE) release 12, intensive research is carried out on performance improvement in terms of a capacity, coverage, coordination between cells, and costs. In the LTE release 12, for such performance improvement, the introduction of various techniques, such as small cell enhancement, macro cell enhancement, a new carrier type, and machine type communication, are being discussed in a technical aspect.

The improvement of the capacity and coverage, that is, the target of the LTE release 12, may be achieved by small cell enhancement based on an inter-site carrier aggregation, integration between LTE-Wireless Local Area Networks (WLANs), and macro cell enhancement. As the size of a cell is reduced, the amount of traffic that is signaled when UE moves may be increased because the UE frequently moves between cells. In order to solve such a problem, a small cell may be optimized by reducing signaling transmitted from a Radio Access Network (RAN) to a core network using small cell enhancement.

A New Carrier Type (NCT) is a frame type that is newly defined differently from the configuration of a legacy frame. The NCT may be a carrier type optimized for a small cell, but may also be applied to a macro cell. In the NCT, overhead generated due to the transmission of a Cell-specific Reference Signal (CRS) can be reduced, and a downlink control channel can be demodulated based on a demodulation reference signal (DM-RS). By newly defining the NCT, the energy of a base station can be reduced and interference occurring in a heterogeneous network (HetNet) can be reduced. Furthermore, reference signal overhead occurring when data is transmitted using a plurality of downlink antennas can be reduced using the NCT. More specifically, the NCT maintains the existing frame structure (e.g., a CP length, a subframe structure, and duplex mode), but may be defined as a carrier that is not backward compatible to rel-11 and below UEs) and that is different in the structure of an actually transmitted reference signal.

SUMMARY OF THE INVENTION

An object of the present invention is to provide a method for configuring a reference signal.

Another object of the present invention is to provide an apparatus which performs a method for configuring a reference signal.

A cell search method in accordance with an aspect of the present invention for achieving the aforementioned object of the present invention may include the steps of receiving a Primary Synchronization Signal (PSS) transmitted in a first Orthogonal Frequency Division Multiplexing (OFDM) symbol, receiving a Secondary Synchronization Signal (SSS) transmitted in a second OFDM symbol, and searching for a Cell-specific Reference Signal (CRS) based on the symbol number of the first OFDM symbol and the symbol number of the second OFDM symbol, wherein the CRS may be a reference signal generated based on a cell ID. The step of searching for a CRS based on the symbol number of the first OFDM symbol and the symbol number of the second OFDM symbol includes the steps of calculating a difference value between the symbol number of the first OFDM symbol and the symbol number of the second OFDM symbol and searching for the CRS based on the difference value, wherein the CRS may be transmitted only in a frequency band corresponding to 6 Resource Blocks (RBs) using the center frequency of the entire frequency band as the center of the frequency. The step of searching for a CRS based on the symbol number of the first OFDM symbol and the symbol number of the second OFDM symbol includes the steps of calculating a difference value between the symbol number of the first OFDM symbol and the symbol number of the second OFDM symbol and searching for the CRS based on the difference value, wherein the CRS may be transmitted only in a frequency band corresponding to the Physical Resource Block 0 (PRB 0) to the Physical Resource Block 5 (PRB 5) of the entire frequency band. The step of searching for a CRS based on the symbol number of the first OFDM symbol and the symbol number of the second OFDM symbol includes the steps of calculating a difference value between the symbol number of the first OFDM symbol and the symbol number of the second OFDM symbol and searching for the CRS based on the difference value, wherein the CRS may be transmitted only in a frequency band corresponding to $N_{RB}^{DL}-6 \sim N_{RB}^{DL}-1$ (wherein, $N_{RB}^{DL}$ is the number of resource blocks included in the entire bandwidth) of the entire frequency band. The step of searching for a CRS based on the symbol number of the first OFDM symbol and the symbol number of the second OFDM symbol includes the steps of calculating a difference value between the symbol number of the first OFDM symbol and the symbol number of the second OFDM symbol and searching for the CRS based on the difference value, wherein the CRS may be transmitted only in a frequency band corresponding to 6 Resource Blocks (RBs) based on the center frequency of the entire frequency band of a subframe #0 and a subframe #5, and the subframe #0 may be a subframe placed at a first position in a time axis in a single frame, and the subframe #5 is a subframe placed at a sixth position in the time axis in the single frame. The step of searching for a CRS based on the symbol number of the first OFDM symbol and the symbol number of the second OFDM symbol includes the steps of calculating a difference value between the symbol number of the first OFDM symbol and the symbol number of the second OFDM symbol and searching for the CRS based on the difference value, wherein the CRS may be transmitted in the entire frequency band of each of a subframe #0 and a subframe #5, and the subframe #0 may be a subframe placed at a first position in a time axis in a single frame, and the subframe #5 is a subframe placed at a sixth position in the time axis in the single frame. In another method, assuming that the index of the first PRB in which the PSS signal is transmitted in the first OFDM symbol is a first PRB index and the index of the second PRB in which the SSS is transmitted in the second OFDM symbol is a second PRB index, the steps of calculating a difference value between the two PRB indices and searching for the CRS based on the difference value may be included.

A wireless apparatus in accordance with an aspect of the present invention for achieving the aforementioned object of the present invention includes a processor, wherein the processor may be configured to search for a Cell-specific Reference Signal (CRS) based on the symbol number of a first Orthogonal Frequency Division Multiplexing (OFDM) symbol in which a Primary Synchronization Signal (PSS) is transmitted and the symbol number of a second OFDM symbol in which a Secondary Synchronization Signal (SSS) is transmitted, and the CRS may be a reference signal generated based on a cell ID. The processor is configured to calculate a difference value between the symbol number of the first OFDM symbol and the symbol number of the second OFDM symbol and to search for the CRS based on the difference value, wherein the CRS may be transmitted only in a frequency band corresponding to 6 Resource Blocks (RBs) using the center frequency of the entire frequency band as the center of the frequency. The processor is configured to calculate a difference value between the symbol number of the first OFDM symbol and the symbol number of the second OFDM symbol and to search for the CRS based on the difference value, wherein the CRS may be transmitted only in a frequency band corresponding to a Physical Resource Block 0 (PRB 0) to a Physical Resource Block 5 (PRB 5) of the entire frequency band. The processor is configured to calculate a difference value between the symbol number of the first OFDM symbol and the symbol number of the second OFDM symbol and to search for the CRS based on the difference value, wherein the CRS may be transmitted only in a frequency band corresponding to $N_{RB}^{DL}-6 \sim N_{RB}^{DL}-1$ (wherein, $N_{RB}^{DL}$ is the number of resource blocks included in the entire bandwidth) of the entire frequency band. The processor is configured to calculate a difference value between the symbol number of the first OFDM symbol and the symbol number of the second OFDM symbol and to search for the CRS based on the difference value, wherein the CRS may be transmitted only in a frequency band corresponding to 6 Resource Blocks (RBs) based on the center frequency of the entire frequency band of a subframe #0 and a subframe #5, and the subframe #0 may be a subframe placed at a first position in a time axis in a single frame, and the subframe #5 is a subframe placed at a sixth position in the time axis in the single frame. The processor is configured to calculate a difference value between the symbol number of the first OFDM symbol and the symbol number of the second OFDM symbol and to search for the CRS based on the difference value, wherein the CRS may be transmitted in the entire frequency band of each of a subframe #0 and a subframe #5, and the subframe #0 may be a subframe placed at a first position in a time axis in a single frame, and the subframe #5 is a subframe placed at a sixth position in the time axis in the single frame.

Inter-cell interference can be reduced.

BRIEF DESCRIPTION OF THE DRAWINGS

FIG. 20 is a conceptual diagram illustrating an NCT subframe having the index 2 or 3 of a CRS configuration in accordance with an embodiment of the present invention.

FIG. 23 is a conceptual diagram illustrating the configuration of a default CRS in accordance with an embodiment of the present invention.

FIG. 31 is a conceptual diagram illustrating a method of sending an additional CRS in accordance with an embodiment of the present invention.

FIG. 32 is a conceptual diagram illustrating a bitmap in accordance with an embodiment of the present invention.

DESCRIPTION OF EXEMPLARY EMBODIMENTS

A wireless device may be fixed or mobile and may also be called another term, such as User Equipment (UE), a Mobile Station (MS), a Mobile Terminal (MT), a User Terminal (UT), a Subscriber Station (SS), a Personal Digital Assistant (PDA), a wireless modem, or a handheld device. Alternatively, the wireless device may be a device that supports only data communication, such as a Machine-Type Communication (MTC) device.

In general, a Base Station (BS) refers to a fixed station that communicates with a wireless device, and the BS may also be called another term, such as an evolved-NodeB (eNB), a Base Transceiver System (BTS), or an access point.

The application of the present invention to 3rd Generation Partnership Project (3GPP) Long Term Evolution (LTE) based on the 3GPP Technical Specification (TS) release 8 or 3GPP LTE-A based on the 3GPP TS release 10 are described below. However, this is only illustrative, and the present invention may be applied to various types of wireless communication networks. Hereinafter, LTE includes LTE and/or LTE-A.

Figure 1:
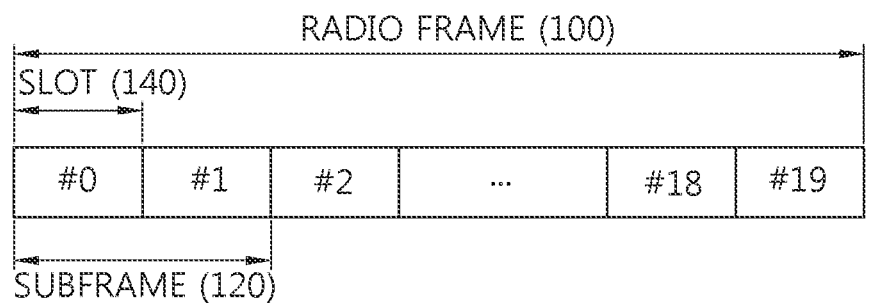
FIG. 1 illustrates the structure of a radio frame in 3$^{rd}$ Generation Partnership Project (3GPP) Long Term Evolution (LTE).

FIG. 1 illustrates the structure of a radio frame in $3^{rd}$ Generation Partnership Project (3GPP) Long Term Evolution (LTE).

In 3GPP LTE, for the structure of a radio frame 100, reference may be made to Paragraph 5 of 3rd Generation Partnership Project (3GPP) TS 36.211 V8.2.0 (2008-03) "Technical Specification Group Radio Access Network; Evolved Universal Terrestrial Radio Access (E-UTRA); Physical channels and modulation (Release 8)". Referring to FIG. 1, the radio frame 100 includes 10 subframes 120, and a single subframe 120 includes two slots 140. The radio frame 100 may be indexed from a slot #0 to a slot #19 according to the slots 140 or may be indexed from a subframe #0 to a subframe #9 according to the subframes 120. The subframe #0 may include the slot #0 and the slot #1.

The time taken for a single subframe 120 to be transmitted is called a Transmission Time Interval (TTI). The TTI may be a scheduling unit for data transmission. For example, the length of a single radio frame 100 may be 10 ms, the length of a single subframe 120 may be 1 ms, and the length of a single slot 140 may be 0.5 ms.

A single slot 140 includes a plurality of Orthogonal Frequency Division Multiplexing (OFDM) symbols in a time domain and includes a plurality of subcarriers in a frequency domain. An OFDM symbol is for representing a single symbol period because OFDMA is used in 3GPP LTE, and may be called another term depending on a multiple access method. For example, an OFDM symbol may be called a Single Carrier-Frequency Division Multiple Access (SC-FDMA) symbol if SC-FDMA is used as an uplink multiple access method. A Resource Block (RB) is a resource allocation unit and includes a plurality of contiguous subcarriers in a single slot. The resource block is disclosed in detail in FIG. 2. The structure of the radio frame 100 disclosed in FIG. 1 is an embodiment of a frame structure. Accordingly, a new radio frame format may be defined by changing the number of subframes 120 included in the radio frame 100, the number of slots 140 included in the subframe 120, or the number of OFDM symbols included in the slot 140 in various ways.

In 3GPP LTE, a single slot is defined to include 7 OFDM symbols if a normal Cyclic Prefix (CP) is used and a single slot is defined to include 6 OFDM symbols if an extension CP is used.

A wireless communication system may be basically divided into a Frequency Division Duplex (FDD) method and a Time Division Duplex (TDD) method. In accordance with the FDD method, uplink transmission and downlink transmission are performed based on differently occupied frequency bands. In accordance with the TDD method, uplink transmission and downlink transmission are performed using identically occupied frequency bands at different times. A channel response in the TDD method is substantially reciprocal. The reason for this is that a downlink channel response and an uplink channel response are almost the same in a given frequency domain. Accordingly, there is an advantage in that a downlink channel response can be obtained from an uplink channel response in a wireless communication system based on TDD. In the TDD method, the downlink transmission of a BS and the uplink transmission of UE cannot be performed at the same time because the entire frequency band is subjected to time division into uplink transmission and downlink transmission. In a TDD system in which uplink transmission and downlink transmission are divided based on a subframe, uplink transmission and downlink transmission are performed in different subframes.

Figure 2:
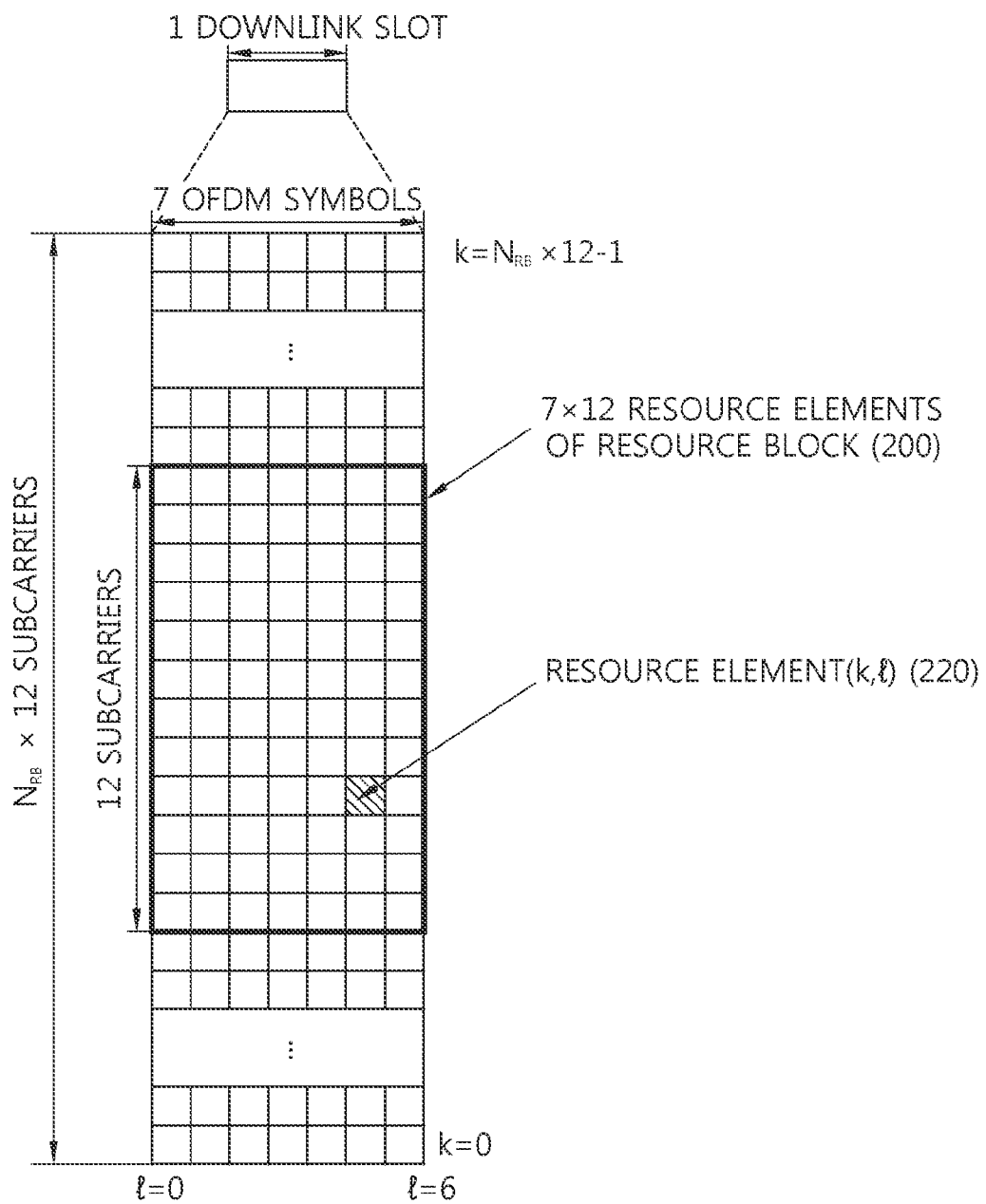
FIG. 2 illustrates an example of a resource grid for a downlink slot.

FIG. 2 illustrates an example of a resource grid for a downlink slot.

The downlink slot includes a plurality of OFDM symbols in a time domain and includes an $N_{RB}$ number of Resource Blocks (RBs) in a frequency domain. $N_{RB}$, that is, the number of RBs included in the downlink slot, depends on a downlink transmission bandwidth configured in a cell. For example, in an LTE system, $N_{RB}$ may be any one of 6 to 110 depending on a transmission bandwidth used. A single RB 200 may include a plurality of subcarriers in the frequency domain. An uplink slot may have the same structure as the downlink slot.

Each element on the resource grid is called a resource element 220. The resource element 220 on the resource grid may be identified by an index pair (k,l) within a slot. In this case, k (k=0, . . . , $N_{RB}\times12-1$) is the index of a subcarrier in the frequency domain, and l (l=0, . . . , 6) is the index of an OFDM symbol in the time domain.

In this case, a single resource block 200 has been illustrated as including 7×12 resource elements 220, including 7 OFDM symbols in the time domain and 12 subcarriers in the frequency domain, but the number of OFDM symbols and the number of subcarriers within the resource block 200 are not limited thereto. The number of OFDM symbols and the number of subcarriers may be changed in various ways depending on the length of a CP, frequency spacing, etc. For example, the number of OFDM symbols is 7 in the case of a normal CP, and the number of OFDM symbols is 6 in the case of an extended CP. In a single OFDM symbol, any one of 128, 256, 512, 1024, 1536, and 2048 may be selected and used as the number of subcarriers.

Figure 3:
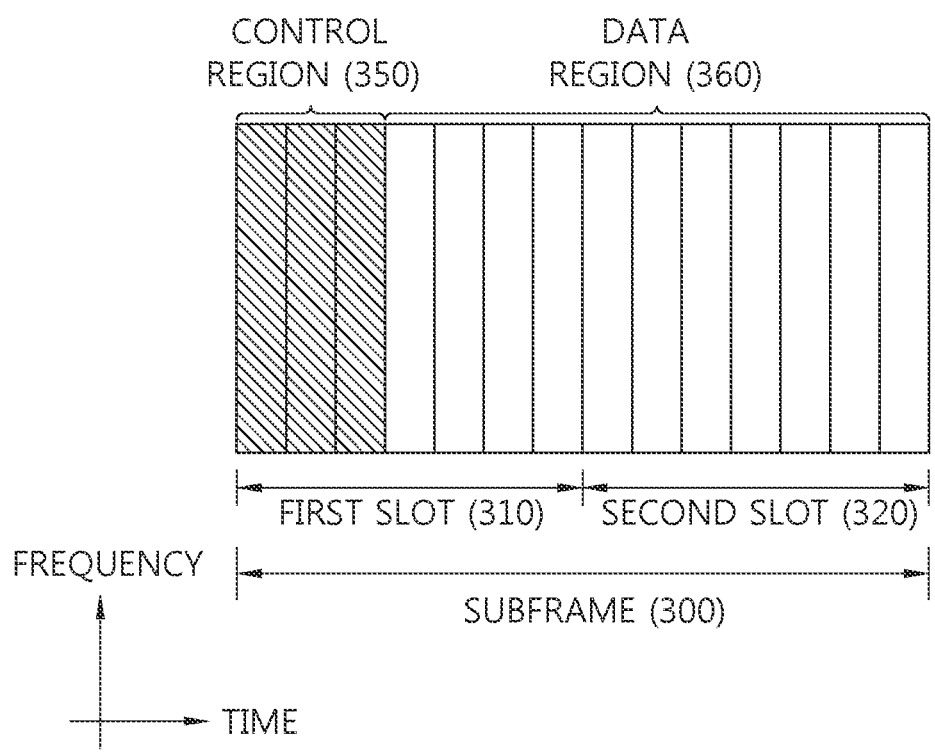
FIG. 3 illustrates the structure of a downlink subframe.

FIG. 3 illustrates the structure of a downlink subframe.

The downlink subframe 300 includes two slots 310, 320 in a time domain, and each of the slots 310, 320 includes 7 OFDM symbols in a normal C. A maximum former 3 OFDM symbols (maximum of 4 OFDM symbols with respect to a 1.4 MHz bandwidth) of the first slot 310 within the subframe 300 become a control region 350 to which control channels are allocated, and the remaining OFDM symbols become a data region 360 to which physical downlink shared channels (PDSCHs) are allocated.

A PDCCH may send information about the resource allocation and transport format of a downlink-shared channel (DL-SCH), information about the resource allocation of an uplink shared channel (UL-SCH), information about paging on a PCH, system information on a DL-SCH, information about the resource allocation of a higher layer control message, such as a random access response transmitted on a PDSCH, a set of transmit power control commands for each MS within a specific UE group, and information about the activation of a Voice Over Internet Protocol (VoIP). A plurality of PDCCH regions may be defined within the control region 350, and UE may monitor a plurality of PDCCHs. A PDCCH is transmitted on a single Control Channel Element (CCE) or an aggregation of some consecutive CCEs. A CCE is a logical allocation unit that is used to provide a coding rate to a PDCCH. A CCE corresponds to a plurality of resource element groups. The format of a PDCCH and the number of bits of a PDCCH are determined by a correlation between the number of CCEs and a coding rate provided by CCEs.

A BS determines a PDCCH format based on Downlink Control Information (DCI) to be transmitted to UE and attaches a Cyclic Redundancy Check (CRC) to the DCI. A unique identifier (Radio Network Temporary Identifier (RNTI)) is masked to the CRC depending on the owner or use of a PDCCH. If a PDCCH is a PDCCH for specific UE, an identifier unique to the UE, for example, a Cell-RNTI (C-RNTI) may be masked to a CRC. Alternatively, if a PDCCH is a PDCCH for a paging message, a paging instruction identifier, for example, a Paging-RNTI (P-RNTI) may be masked to a CRC. If a PDCCH is a PDCCH for a System Information Block (SIB), a system information identifier, a System Information-RNTI (SI-RNTI), may be masked to a CRC. A Random Access-RNTI (RA-RNTI) may be masked to a CRC in order to denote a random access response, that is, a response to the transmission of a random access preamble by UE.

Figure 4:
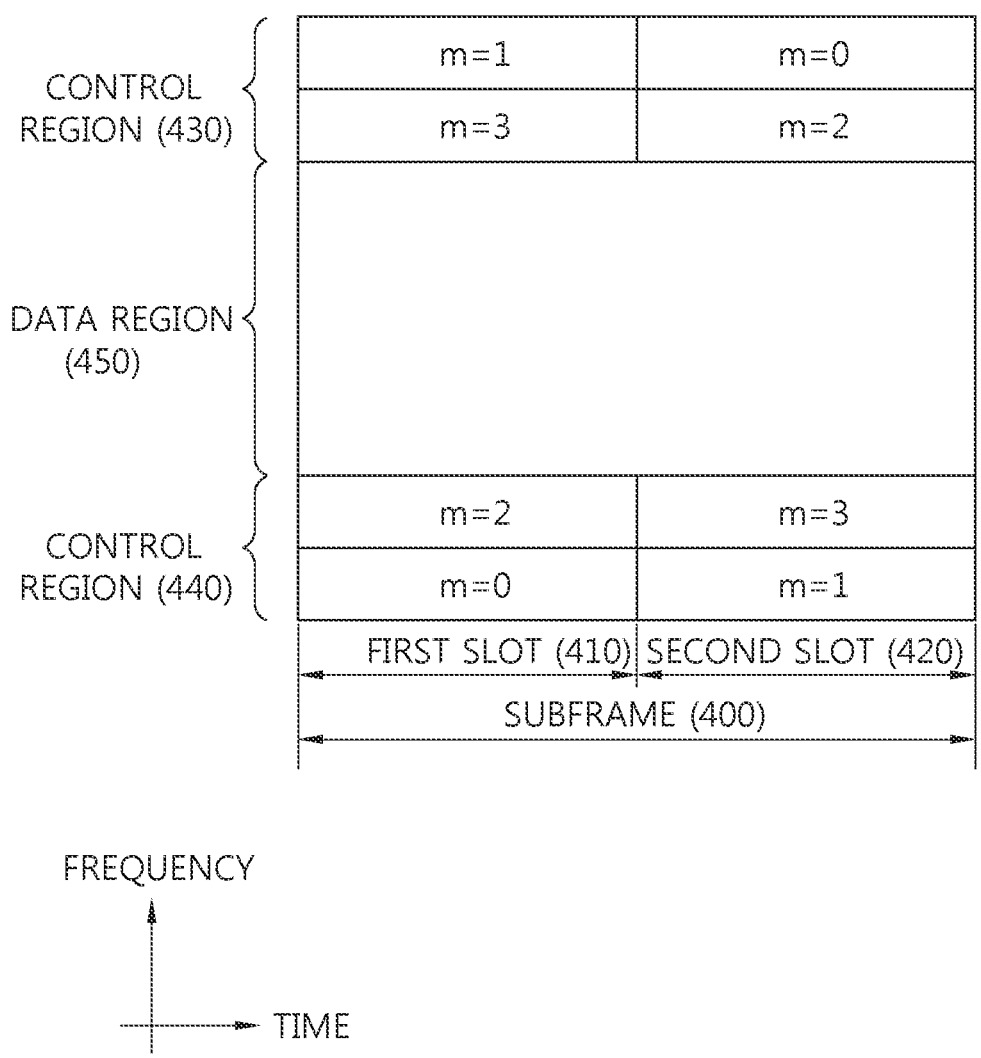
FIG. 4 illustrates the structure of an uplink subframe.

FIG. 4 illustrates the structure of an uplink subframe.

The uplink subframe may be divided into control regions 430, 440 and a data region 450 in a frequency domain. Physical uplink control channels (PUCCHs) on which uplink control information is to be transmitted are allocated to the control regions 430, 440. Physical uplink shared channels (PUSCHs) on which data is to be transmitted are allocated to the data region 450. If an instruction is given by a higher layer, UE may support the simultaneous transmission of PUSCHs and PUCCHs.

A PUCCH for a single MS may be allocated in the form of a Resource Block (RB) pair in the subframe 400. Resource blocks belonging to a resource block pair may occupy different subcarriers in a first slot 410 and a second slot 420. A frequency occupied by resource blocks belonging to an RB pair allocated to a PUCCH is changed on the basis of a slot boundary. This is called that the frequency of the RB pair allocated to the PUCCH has been frequency-hopped at the slot boundary. UE may obtain a frequency diversity gain by sending uplink control information through different subcarriers over time. 'm' is a location index indicative of the logical frequency domain location of an RB pair allocated to a PUCCH in the subframe.

Uplink control information transmitted on a PUCCH includes Hybrid Automatic Repeat reQuest (HARQ) acknowledgement (ACK)/non-acknowledgement (NACK), a Channel Quality Indicator (CQI) indicative of a downlink channel state, a Scheduling Request (SR), that is, an uplink radio resource allocation request, and so on.

A PUSCH is mapped to an uplink shared channel (UP-SCH), that is, a transport channel. Uplink data transmitted on a PUSCH may be a transport block, that is, a data block for an UL-SCH transmitted during the TTI. The transport block may be user information. Alternatively, the uplink data may be multiplexed data. The multiplexed data is data in which a transport block for an UL-SCH and control information have been multiplexed. For example, control information multiplexed with data may include a CQI, a Precoding Matrix Indicator (PMI), an HARQ, a Rank Indicator (RI), etc. Alternatively, the uplink data may include only control information.

Figure 5:
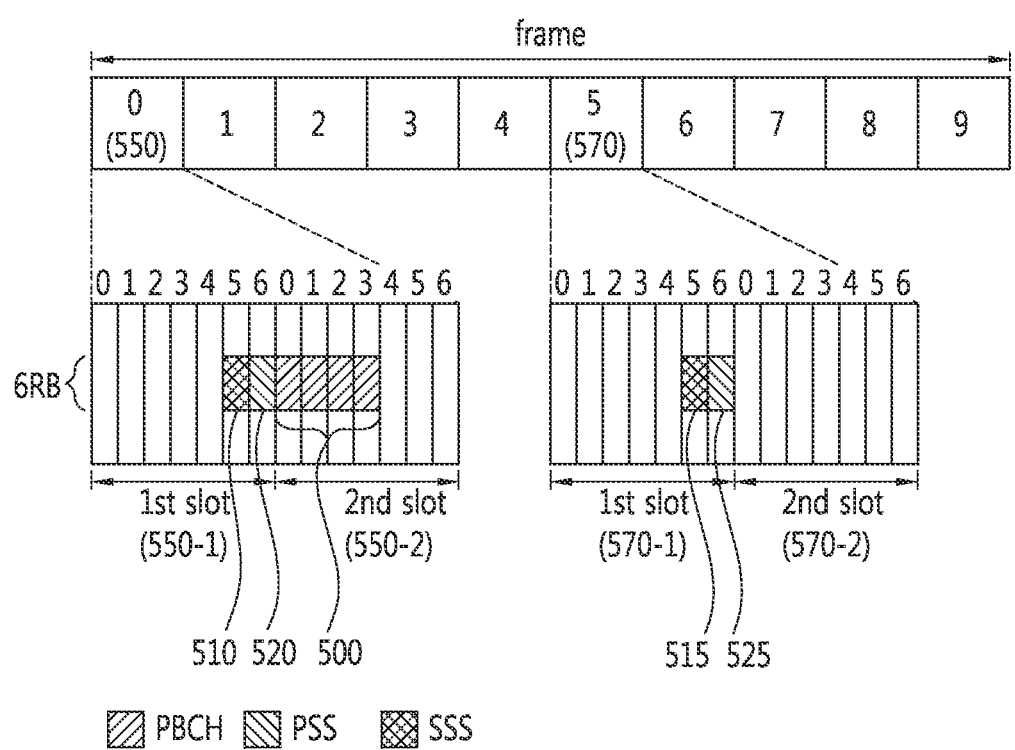
FIG. 5 illustrates the transmission of a synchronization signal and a physical broadcast channel (PBCH) when Frequency Division Duplex (FDD) is used as a duplex method.

FIG. 5 illustrates the transmission of a synchronization signal and a physical broadcast channel (PBCH) when Frequency Division Duplex (FDD) is used as a duplex method.

The physical broadcast channel (PBCH) 500 is transmitted in the former 4 OFDM symbols of the second slot 550-2 of the first subframe (subframe 550 of an index 0) of a radio frame. The PBCH 500 carries system information that is essential for a wireless device to communicate with a BS, and system information transmitted through the PBCH 500 is called a Master Information Block (MIB). System information transmitted on a PDSCH indicated by a PDCCH is called a System Information Block (SIB) compared to the MIB.

A seventh OFDM symbol (an OFDM symbol of an index 6) that is included in OFDM symbols allocated to the first slot 550-1, 570-1 of a first subframe (subframe of an index 0 550) and a sixth subframe (subframe 570 of an index 5) may include a Primary Synchronization Signal (PSS) 520, 525. The PSS 520, 525 may be used to obtain OFDM symbol synchronization or slot synchronization. Furthermore, information about a physical cell identification (ID) may be obtained through the PSS 520, 525. Primary Synchronization Code (PSC) is a sequence used to generate the PSS 520, 525, and the 3GPP LTE specification defines 3 PSCs. The PSS 520, 525 is generated using one of the 3 PSCs depending on a cell ID. UE may receive the PSS 520, 525 and obtain information about a cell ID based on PSC.

A sixth OFDM symbol (an OFDM symbol of an index 5) that is included in OFDM symbols allocated to the first slot 550-1, 570-1 of the first subframe (subframe, 550 of the index 0) and the sixth subframe (subframe 570 of the index 5) may include a Secondary Synchronization Signal (SSS) 520, 525.

The first SSS 520 may be transmitted through the sixth OFDM symbol of the first slot 550-1 of the first subframe 550, and the second SSS 525 may be transmitted through the sixth OFDM symbol of the first slot 570-1 of the sixth subframe 570. The SSS 520, 525 may be used to obtain frame synchronization. The SSS 520, 525 is used to obtain information about a cell ID along with the PSS 510, 515.

The first SSS 520 and the second SSS 525 may be generated using different Secondary Synchronization Codes (SSCs). Assuming that each of the first SSS 520 and the second SSS 525 includes 31 subcarriers, two SSC sequences having a length 31 are used in each of the first SSS 520 and the second SSS 525.

From a viewpoint of a frequency domain, the PBCH 500, the PSS 510, 520, and the SSS 515, 525 are transmitted within a frequency bandwidth corresponding to 6 RBs on the basis of the center of the subframe.

In general, a Reference Signal (RS) defined in 3GPP LTE is transmitted in the form of a sequence. A specific sequence may be used as an RS sequence without special limitations. A Phase Shift Keying (PSK)-based computer-generated sequence may be used as an RS sequence. PSK may include, for example, Binary Phase Shift Keying (BPSK) and Quadrature Phase Shift Keying (QPSK). Alternatively, a Constant Amplitude Zero Auto-Correlation (CAZAC) sequence may be used as an RS sequence. The CAZAC sequence may include, for example, a Zadoff-Chu (ZC)-based sequence, a ZC sequence with cyclic extension, and a ZC sequence with truncation. Alternatively, a pseudo-random (PN) sequence may be used as an RS sequence. The PN sequence may include, for example, an m-sequence, a computer-generated sequence, a gold sequence, and a Kasami sequence. Alternatively, a cyclically shifted sequence may be used as an RS sequence.

A downlink RS may be divided into a Cell-specific Reference Signal (CRS), a Multimedia Broadcast and multicast Single Frequency Network (MBSFN) RS, a UE-specific RS, a Positioning RS (PRS), and a Channel State Information-RS (CSI-RS). The CRS is an RS transmitted to all MSs within a cell and may be used for channel measurement for Channel Quality Indicator (CQI) feedback and channel estimation for a PDSCH. The MBSFN RS may be transmitted in a subframe allocated for MBSFN transmission. The UE-specific RS is an RS received by specific UE or a specific UE group within a cell and may also be called a demodulation RS (DMRS). The DMRS is chiefly used for specific UE or specific UE group to demodulate data. The PRS may be used to estimate the location of UE. The CSI RS is used for LTE-A UE to perform channel estimation on a PDSCH. The CSI RS is relatively sparsely deployed in a frequency domain or a time domain and may be punctured in the data region of a common subframe or MBSFN subframe. A CQI, a PMI, an RI, etc. may be reported by UE, if necessary, through the estimation of CSI.

The CRS is transmitted in all downlink subframes within a cell which supports the transmission of a PDSCH. The CRS may be transmitted on antenna ports 0 to 3, and the CRS may be defined only for $\Delta f=15$ kHz.

Figure 6:
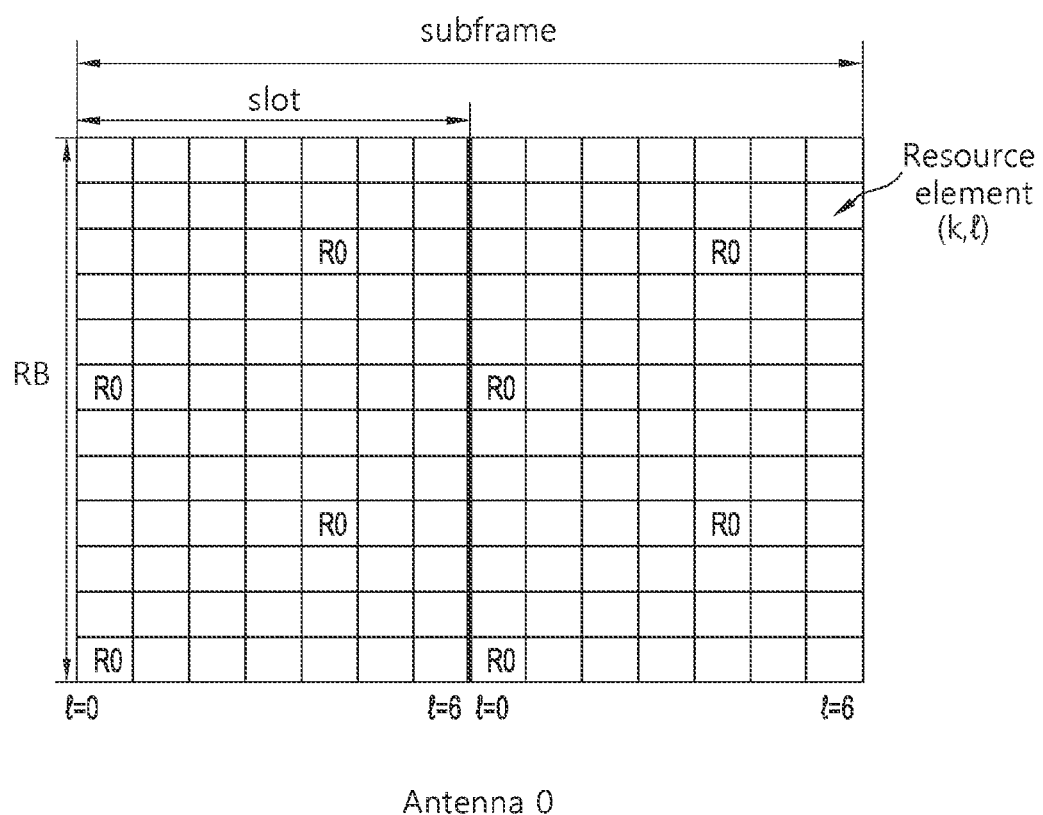
FIGS. 6 to 8 illustrate RBs to which CRSs are mapped.
Figure 7:
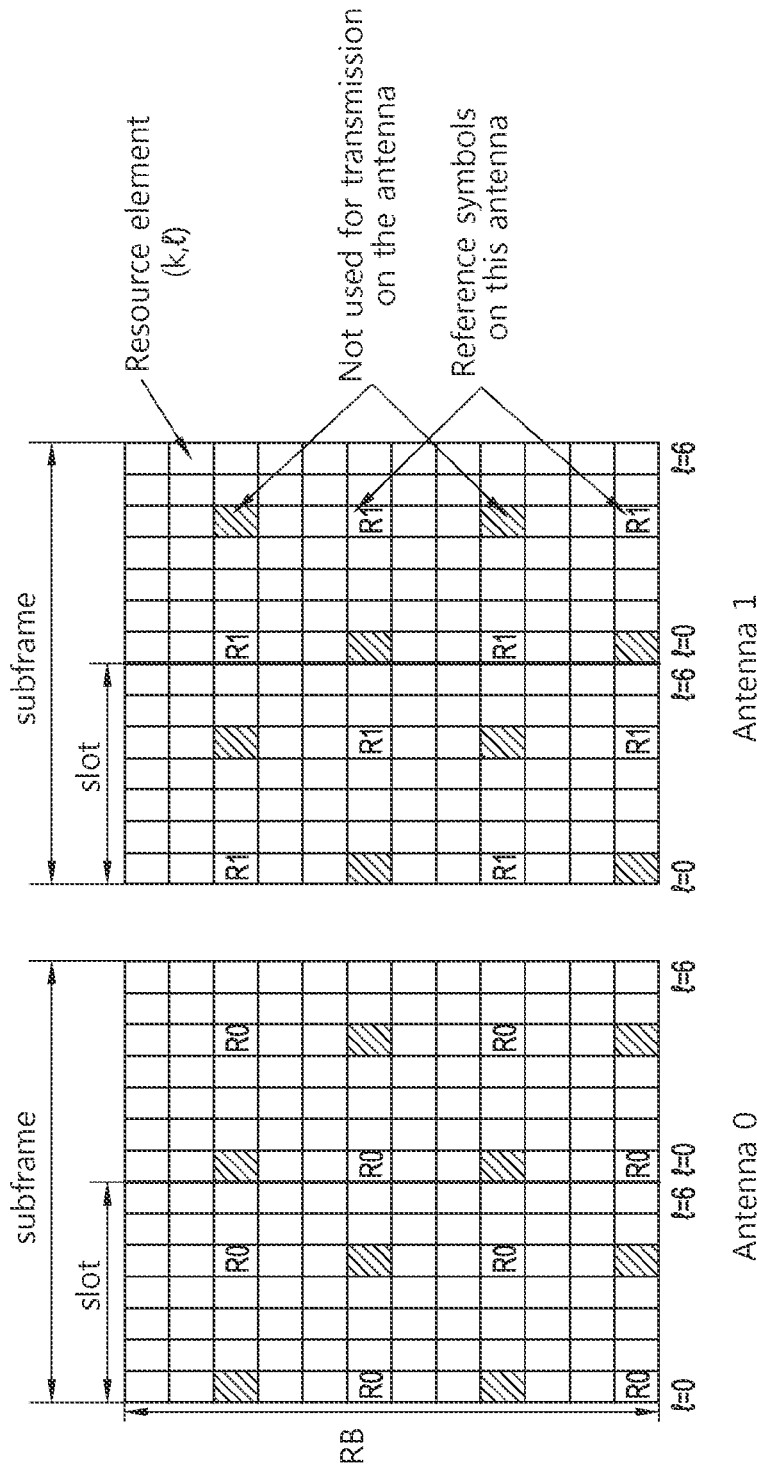
Figure 8:
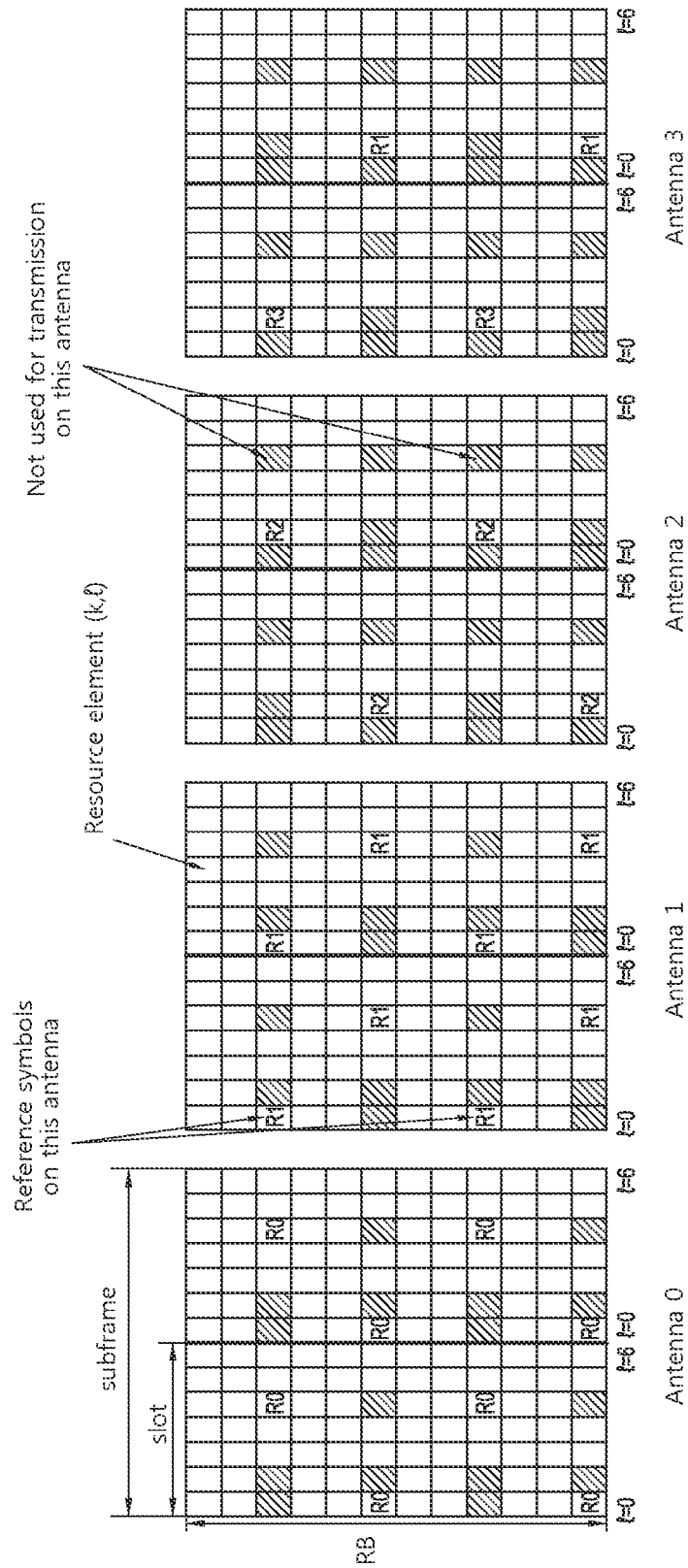

FIGS. 6 to 8 illustrate RBs to which CRSs are mapped.

FIG. 6 illustrates an example of a pattern in which a CRS is mapped to an RB when a BS uses a single antenna port, FIG. 7 illustrates an example of a pattern in which a CRS is mapped to an RB when a BS uses two antenna ports, and FIG. 8 illustrates an example of a pattern in which a CRS is mapped to an RB when a BS uses four antenna ports.

Furthermore, the CRS pattern may be used to support the characteristics of LTE-A. For example, the CRS pattern may be used to support characteristics, such as a Coordinated Multi-Point (CoMP) transmission reception scheme or spatial multiplexing. Furthermore, the CRS may be used for the measurement of channel quality, the detection of a CP, and time/frequency synchronization.

Referring to FIGS. 6 to 8, in the case of multi-antenna transmission in which a BS uses a plurality of antenna ports, a single resource grid is present in each antenna port. 'R0' is indicative of the RS of a first antenna port, 'R1' is indicative of the RS of a second antenna port, 'R2' is indicative of the RS of a third antenna port, and 'R3' is indicative of the RS of a fourth antenna port. The locations of the R0 to R3 within a subframe are not overlapped with one another. l is the location of an OFDM symbol within a slot, and f, has a value between 0 and 6 in a normal CP.

In a single OFDM symbol, the RS of each antenna port is placed at an interval of 6 subcarriers. The number of R0s and the number of R1s within a subframe are the same, and the number of R2s and the number of R3s within the subframe are the same. The number of R2s and the number of R3s within the subframe are smaller than the number of R0s and the number of R1s. An RE used in the RS of one antenna port is not used in the RS of the other antenna. The reason for this is that interference between the antenna ports is avoided.

The number of CRSs corresponding to the number of antenna ports is always transmitted regardless of the number of streams. A CRS has an independent RS in each antenna port. The location of a frequency domain and the location of a time domain within the subframe of a CRS are determined regardless of UE. A CRS sequence multiplied by a CRS is also generated regardless of UE. Accordingly, all pieces of UE within a cell may receive a CRS. However, the location of a CRS within a subframe and a CRS sequence may be determined based on a cell ID. The location of a CRS within a subframe in the time domain may be determined by an antenna port number and the number of OFDM symbols within an RB. The location of a CRS within a subframe in the frequency domain may be determined by an antenna number, a cell ID, an OFDM symbol index t, and a slot number within a radio frame.

A CRS sequence may be applied to each OFDM symbol within a single subframe. A CRS sequence may vary depending on a cell ID, a slot number within a single radio frame, the index of an OFDM symbol within a slot, and the type of CP. The number of RS subcarriers for each antenna port on a single OFDM symbol is two. Assuming that a subframe includes $N_{RB}$ RBs in the frequency domain, the number of RS subcarriers for each antenna on a single OFDM symbol is $2 \times N_{RB}$. Accordingly, the length of a CRS sequence becomes $2 \times N_{RB}$.

Equation 1 illustrates an example of a CRS sequence r(m).

$$r(m) = \frac{1}{\sqrt{2}}(1 - 2 \cdot c(2m)) + j\frac{1}{\sqrt{2}}(1 - 2 \cdot (2m + 1)) \quad \langle \text{Equation 1} \rangle$$

In Equation 1, m is $0, 1, \ldots, 2N_{RB}\text{max}-1$. $2N_{RB}\text{max}$ is the number of RSs corresponding to a maximum bandwidth. For example, in 3GPP LTE, $2N_{RB}\text{max}$ is 110. c(i) is a PN sequence and a pseudo random sequence, and may be defined by a Gold sequence of length-31. Equation 2 illustrates an example of a Gold sequence c(n).

$$c(n) = (x_1(n + N_C) + x_2(n + N_C))\text{mod}2 \quad \langle \text{Equation 2} \rangle$$

$$x_1(n + 31) = (x_1(n + 3) + x_1(n))\text{mod}2$$

$$x_2(n + 31) = (x_2(n + 3) + x_2(n + 2) + x_2(n + 1) + x_2(n))\text{mod}2$$

In Equation 2, $N_C=1600$, $x_1(i)$ is a first m-sequence, and $x_2(i)$ is a second m-sequence. For example, the first m-sequence or the second m-sequence may be initialized depending on a cell ID, a slot number within a single radio frame, the index of an OFDM symbol within a slot, and the type of CP every OFDM symbol.

In the case of a system having a bandwidth smaller than $2N_{RB}max$, only a specific part that belongs to an RS sequence generated to have a $2 \times 2N_{RB}max$ length and that has a $2 \times N_{RB}$ length may be selected and used.

Frequency hopping may be applied to a CRS. A frequency hopping pattern may have a cycle of a single radio frame (10 ms), and each frequency hopping pattern corresponds to a single identity (ID) group.

Hereinafter, in embodiments of the present invention, data transmitted through a specific channel is represented as a term "channel data" and time and frequency transmission resources allocated to a channel are represented as a term a "channel region".

In LTE release 8/9/10/11 systems, a reference signal, a Cell-specific Reference Signal (CRS) that is a synchronization signal, a Primary Sync Signal (PSS)/Secondary Synch Signal (SSS), etc. may be transmitted through downlink carriers. Furthermore, downlink carriers may be allocated to channels, for example, a physical downlink control channel (PDCCH) and a physical broadcast channel (PBCH) in order to send channel data.

In a next communication system after the LTE release 8/9/10/11 systems, a carrier on which at least one of a reference signal, a synchronization signal, and channel data is not transmitted and in which a new reference signal is defined may be introduced in order to improve an interference problem between a plurality of cells and to extend a carrier. A subframe using a carrier may be defined and used as an extension carrier subframe or a New Carrier Type (NCT) subframe. For example, a PDCCH, that is, the existing control channel, may not be transmitted on the NCT subframe.

In a legacy LTE system, an FDD downlink carrier subframe using Frequency Division Duplexing (FDD) as a duplex method and a TDD downlink carrier subframe using Time Division Duplexing (TDD) as a duplex method have been defined. FDD and TDD downlink subframes send control information through control channels, such as a physical downlink control channel (PDCCH), a physical HARQ indicator channel (PHICH), and a physical control format indicator channel (PCFICH).

Furthermore, in the existing LTE system, some of resources included in the remaining downlink subframes may be used to send physical downlink shared channel (PDSCH) data.

The number of OFDM symbols used as PDCCH resources is a value indicated by a PCFICH. The number of OFDM symbols used as PDCCH resources may be a dynamically changing value or a value semi-statically indicated by Radio Resource Control (RRC) signaling. The number of OFDM symbols used as PDCCH resources is limited, and thus an enhanced (e)-PDCCH, that is, a new PDCCH, may be multiplexed with a PDSCH and transmitted.

Figure 9:
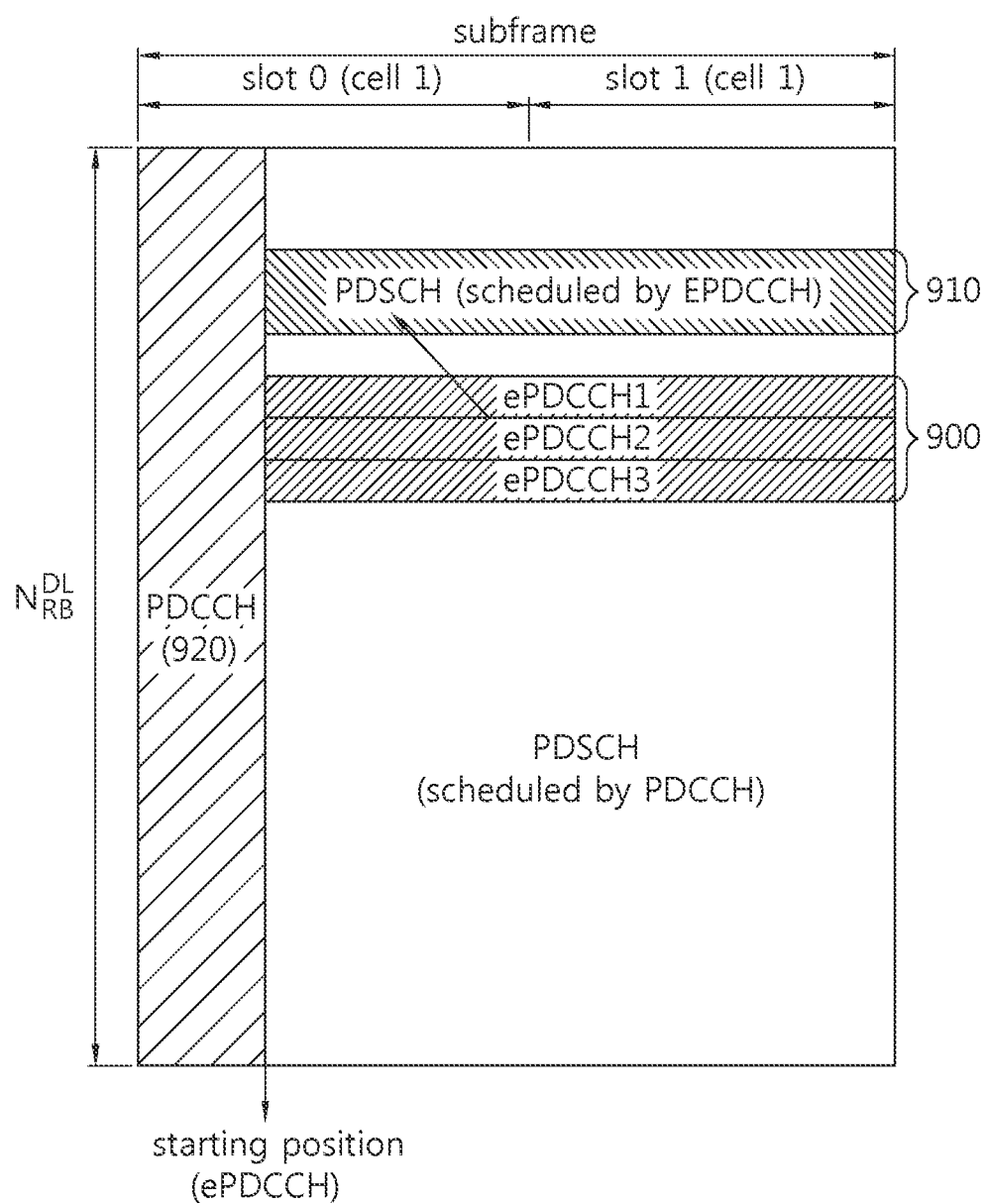
FIG. 9 is a conceptual diagram illustrating resources allocated to e-PDCCHs.

FIG. 9 is a conceptual diagram illustrating resources allocated to e-PDCCHs.

Referring to FIG. 9, a PDSCH region 910 may be scheduled in a specific location of a subframe based on data transmitted through an e-PDCCH region 900.

In terms of a time domain, the e-PDCCH region 900 may be placed in a location next to an existing PDCCH region 920. For example, if the existing PDCCH region 920 is transmitted in the first 3 OFDM symbols of the subframe, the e-PDCCH region 900 may be added to OFDM symbols placed next to the first 3 OFDM symbols of the subframe. In terms of a frequency domain, the existing PDCCH region 920 and the e-PDCCH region 900 may be matched or may be differently configured. FIG. 9 illustrates an example in which the e-PDCCH region 9000 is configured only in some frequency band of the existing PDCCH region 920.

In this case, the e-PDCCH region 900 may mean a radio resource region in which different pieces of control information can be transmitted in the respective nodes of a multi-node system. In this sense, the e-PDCCH region 900 may be called a "Remote Radio Head (RRH) control region".

Data for advanced UE may be transmitted in the e-PDCCH region 900. Existing UE (or legacy UE) may mean UE operating according to a current communication standard. In other words, the existing UE may be first type UE operating according to a first Radio Access Technology (RAT), for example, 3GPP LTE Rel-11, and the advanced UE may be second type UE operating according to a second RAT, for example, 3GPP LTE Rel-12. In this case, the second RAT may be the evolution of the first RAT.

Furthermore, a reference signal not used by the existing UE may be used in the e-PDCCH region 900. The advanced UE may receive a signal using a reference signal not used by the existing UE in the e-PDCCH region 900.

In an embodiment of an NCT subframe structure, a frame structure to which the legacy PDCCH 920 is not allocated, but only the e-PDCCH 900 is allocated may be defined and used as a control channel of the NCT subframe. Furthermore, a Multicast Broadcast Single Frequency Network (MBSFN) subframe may be defined and used in the NCT subframe. Whether or not the PDCCH 920 is allocated and how many OFDM symbols are allocated and used if the PDCCH 920 is used may be indicated in the MBSFN subframe through RRC signaling.

In another embodiment of the NCT subframe, a method of sending a reference signal may be newly defined in the NCT subframe. For example, the NCT subframe may be defined so that a CRS defined to send the existing entire frequency bandwidth is transmitted only in some frequency bandwidths of the entire frequency band or is not transmitted in the entire frequency band.

A main object to newly define the NCT subframe is to increase a cell capacity in an inter-cell interference environment. In the NCT subframe, several CRS patterns different from a CRS pattern transmitted in an existing subframe may be configured and used in order to increase a cell capacity in an inter-cell interference environment.

An Almost Blank Subframe (ABS) may be used as one of methods for reducing inter-cell interference. The ABS denotes a subframe in which data is not transmitted or in which only very small transmission power is permitted although data is transmitted. That is, the ABS may send only a signal having a small size, such as a CRS, in order to reduce an influence on a neighboring cell and interference with a neighboring cell.

The NCT subframe may not send a CRS in order to improve inter-cell interference. If a CRS is transmitted, however, the tracking and synchronization performance of UE may be affected. Accordingly, there is a need to define a different configurable CRS pattern that may be distinguished between cells in order to not generate inter-cell interference when the NCT subframe is used and to not affect the tracking and synchronization performance of UE.

If CRSs having different configurations are used in respective cells in an NCT subframe, UE included in each cell receives a subframe including a different CRS configuration, and thus inter-cell interference can be prevented and the tracking and synchronization performance of UE may not be deteriorated. If the number of CRS configurations used to perform a cell search when UE perform the cell search is increased, however, the search complexity of the UE may be increased. Accordingly, to solve the inter-cell interference problem using a method of defining an NCT subframe by simply increasing the number of different CRS patterns is limited. Accordingly, in accordance with an embodiment of the present invention, a CRS may be transmitted using a limited number of CRS configurations in the NCT subframe.

The CRS configurations of an NCT subframe newly defined in accordance with an embodiment of the present invention may include the following configurations.

Configuration 1: when a CRS is not used (No CRS)

Configuration 2: a frequency-fixed CRS configuration every subframe

Configuration 3: a time-fixed CRS configuration in the entire band

Configuration 4: a frequency- and time-fixed CRS configuration

Configuration 5: a CRS configuration configurable according to a frequency and time Various CRS configurations may be generated using the CRS configuration 1 to the CRS configuration 5. In the following embodiments of the present invention, a method of configuring a CRS through an index 0 to index 5 is described below.

The index 0 illustrates a case where a CRS is not transmitted if an NCT subframe is not an MBSFN frame. The NCT subframe of the index 0 may use a demodulation Reference Signal (DM-RS) and a Channel State Information Reference Signal (CSI-RS) as a reference signal instead of a CRS.

The NCT subframe of the index 0 may use resource elements, configured as resources in which a CRS is transmitted in the existing release 10 LTE standard (release-10 LTE specification, TS 36.211), as resources for sending a different signal. In another method, the NCT subframe of the index 0 may implement a blank subframe using a method in which a Resource Element (RE) specified to send a CRS through the antenna port 0, 1, 2, 3 is not used.

FIGS. 10 to 13 are conceptual diagrams illustrating the CRS configurations of the NCT subframes of the index 1 to the index 4 in accordance with embodiments of the present invention.

Figure 10:
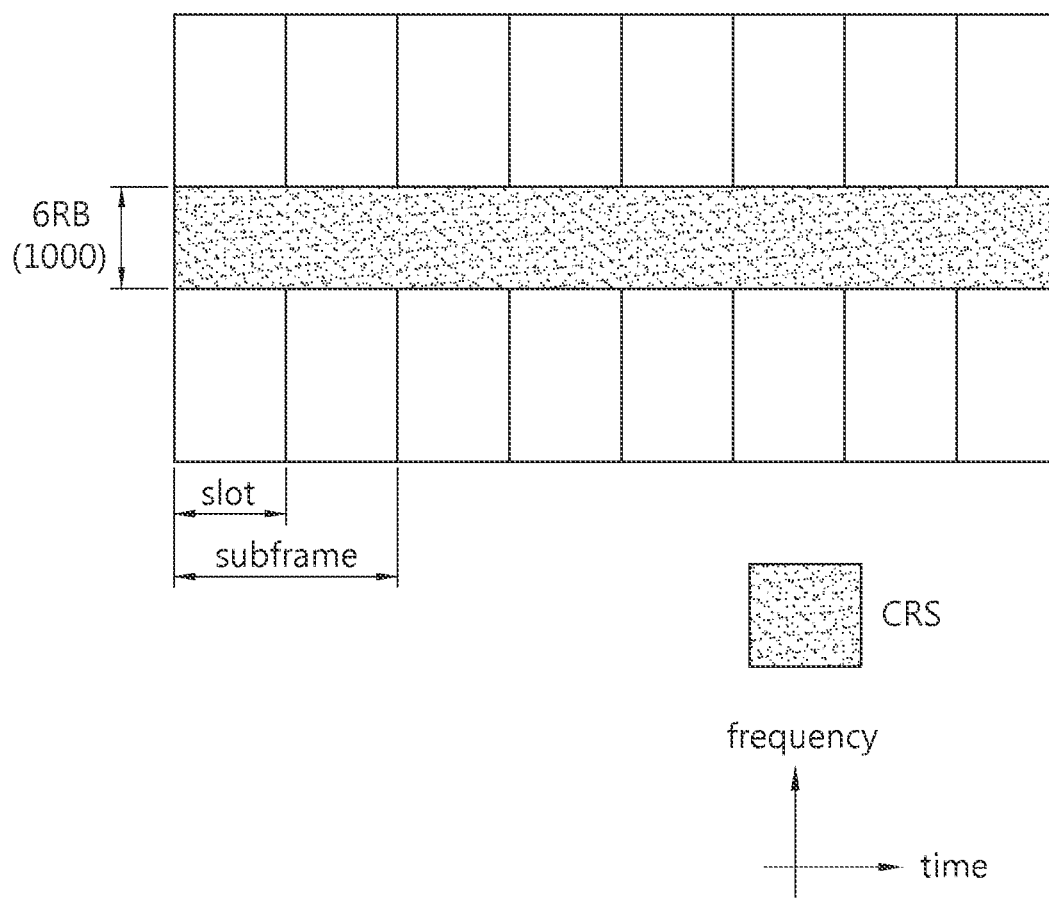
FIG. 10 illustrates an NCT subframe of an index 1 in which a fixed CRS is configured based on the frequency in each subframe in accordance with an embodiment of the present invention.

FIG. 10 illustrates the NCT subframe of the index 1 in which a fixed CRS is configured based on the frequency in each subframe in accordance with an embodiment of the present invention.

Referring to FIG. 10, the NCT subframe of the index 1 may send a CRS in all subframes (except an MBSFN subframe), but may send the CRS in a frequency band corresponding to 6 RBs 1000 at the center of the frequency band. If a CRS is transmitted as in the index 1, the existing UE may receive the CRS transmitted in the 6 RBs 1000 at the center and perform a cell search procedure.

If the NCT subframe of the index 1 assumes a single antenna port and sends a CRS, the CRS may be transmitted in CRS resources allocated in an antenna port 0 or an antenna port 1. In the NCT subframe of the index 1, a CRS transmission pattern of the antenna port 0 or the antenna port 1 may be selected and used in order to reduce inter-cell interference.

The CRS configuration configured as the antenna port 0 or the antenna port 1 may be configured as in the mapping of resources in the case where an antenna port disclosed in the 6.10.1 cell-specific reference signal of 3rd Generation Partnership Project; Technical Specification Group Radio Access Network; Evolved Universal Terrestrial Radio Access (E-UTRA); Multiplexing and channel coding (Release 10), that is, 3GPP TS 36.211 V10.2.0 disclosed on Jun. 1, 2011, is p=0 or 1.

Figure 11:
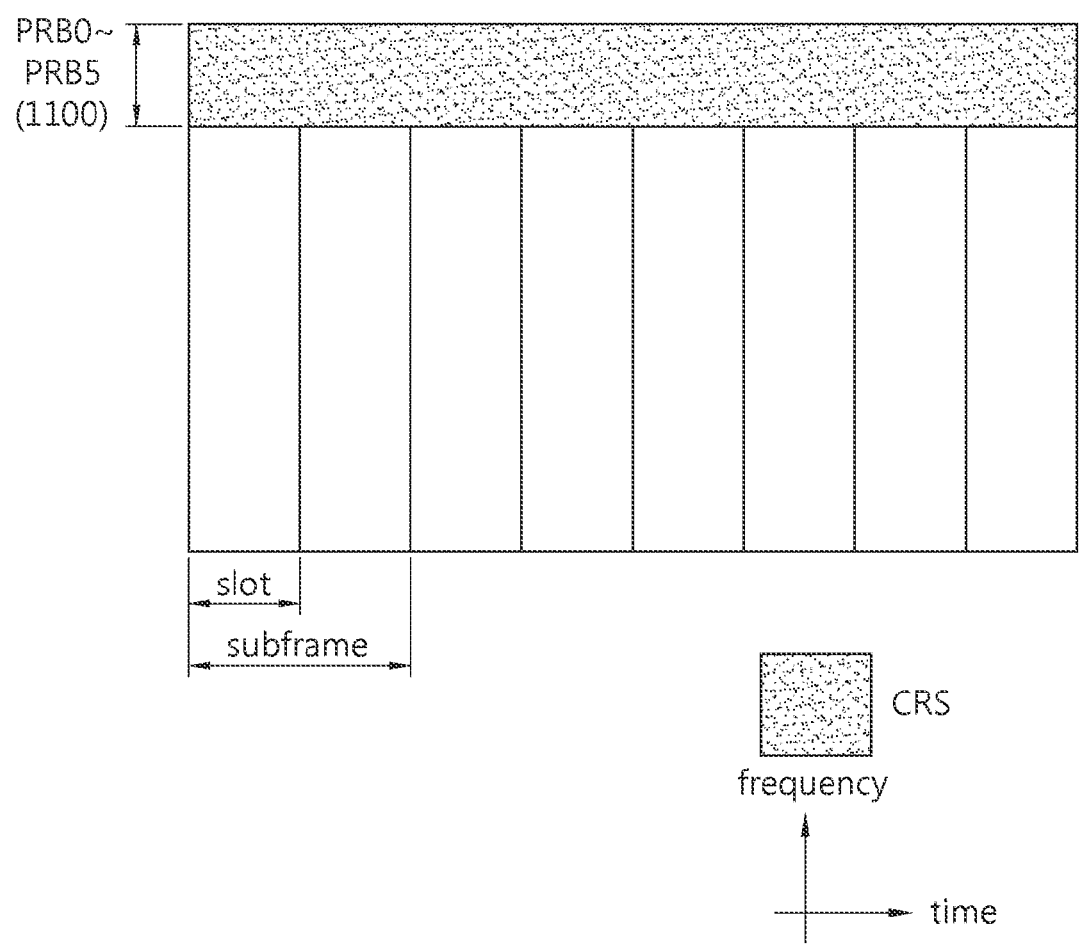
FIG. 11 illustrates an NCT subframe of an index 2 in which a fixed CRS is configured based on the time in each subframe in accordance with an embodiment of the present invention.

FIG. 11 illustrates the NCT subframe of the index 2 in which a fixed CRS is configured based on the time in each subframe in accordance with an embodiment of the present invention.

Referring to FIG. 11, the NCT subframe of the index 2 may be transmitted through subcarriers in which a CRS corresponds to PRB indices 0 to 5 1100, for example, in all subframes except an MBSFN subframe. The PRB indices 0 to 5 1100 are varying values, and the location of a frequency band in which a CRS is transmitted may be changed. In the NCT subframe of the index 2, in order to set the location of a PRB in which a CRS is transmitted, the CRS may be transmitted in a frequency band that belongs to other frequency bands except the center frequency of a frequency bandwidth and that corresponds to 6 RBs.

As in the index 1, a CRS pattern configured as the existing antenna port 0 or antenna port 1 may be selectively used as a CRS pattern configured in the NCT subframe of the index 2.

Figure 12:
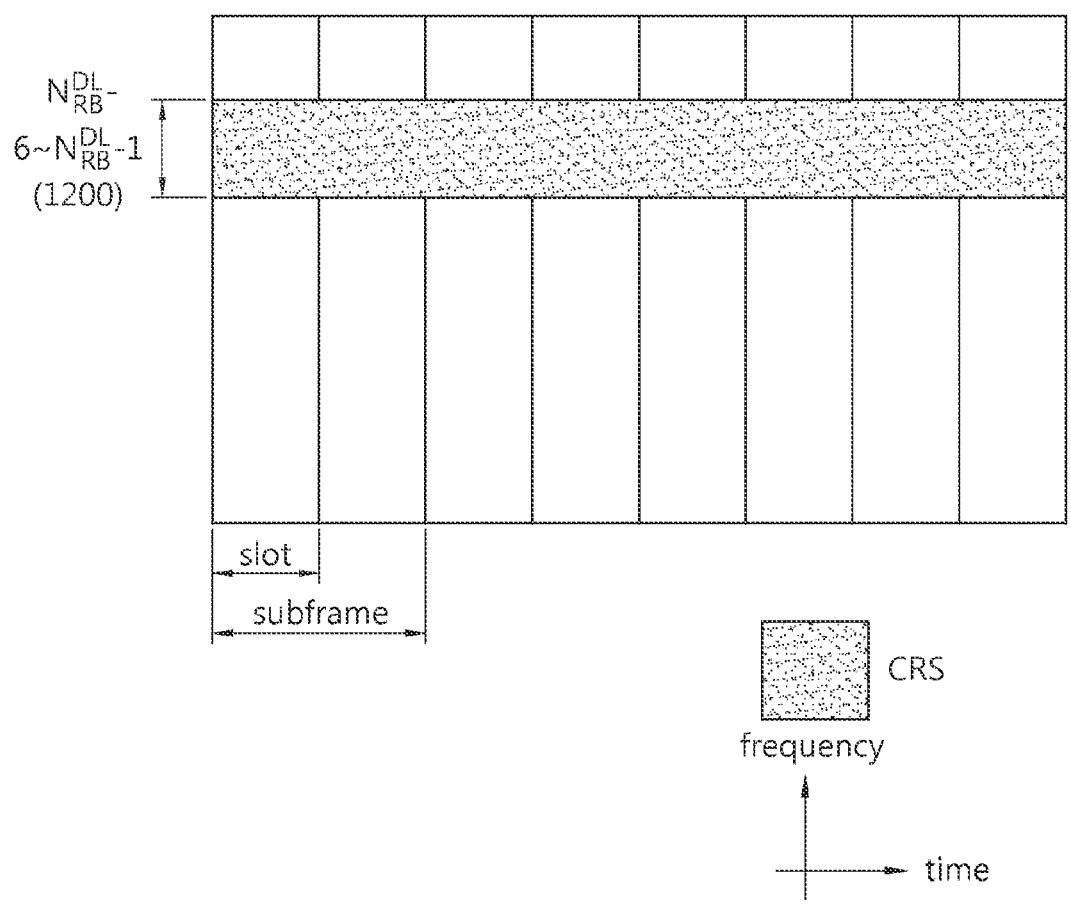
FIG. 12 illustrates an NCT subframe of an index 3 in which a fixed CRS is configured based on frequency resources and time resources in each subframe in accordance with an embodiment of the present invention.

FIG. 12 illustrates the NCT subframe of the index 3 in which a fixed CRS is configured based on frequency resources and time resources in each subframe in accordance with an embodiment of the present invention.

Referring to FIG. 12, the NCT subframe of the index 3 may be transmitted in locations in which a CRS is $N_{RB}^{DL}-6$ to $N_{RB}^{DL}-1$ 1200 of PRB indices in all subframes other than an MBSFN subframe. That is, the CRS may be transmitted in a specifically configured CRS transmission frequency band. The $N_{RB}^{DL}-6$ to $N_{RB}^{DL}-1$ 1200, that is, the PRB indices which the CRS is transmitted is an exemplary value, and the location of the transmitted CRS may be changed according to a configuration.

As in the index 1, a CRS pattern configured as the existing antenna port 0 or antenna port 1 may be selectively used as a CRS pattern configured in the NCT subframe of the index 3.

Figure 13:
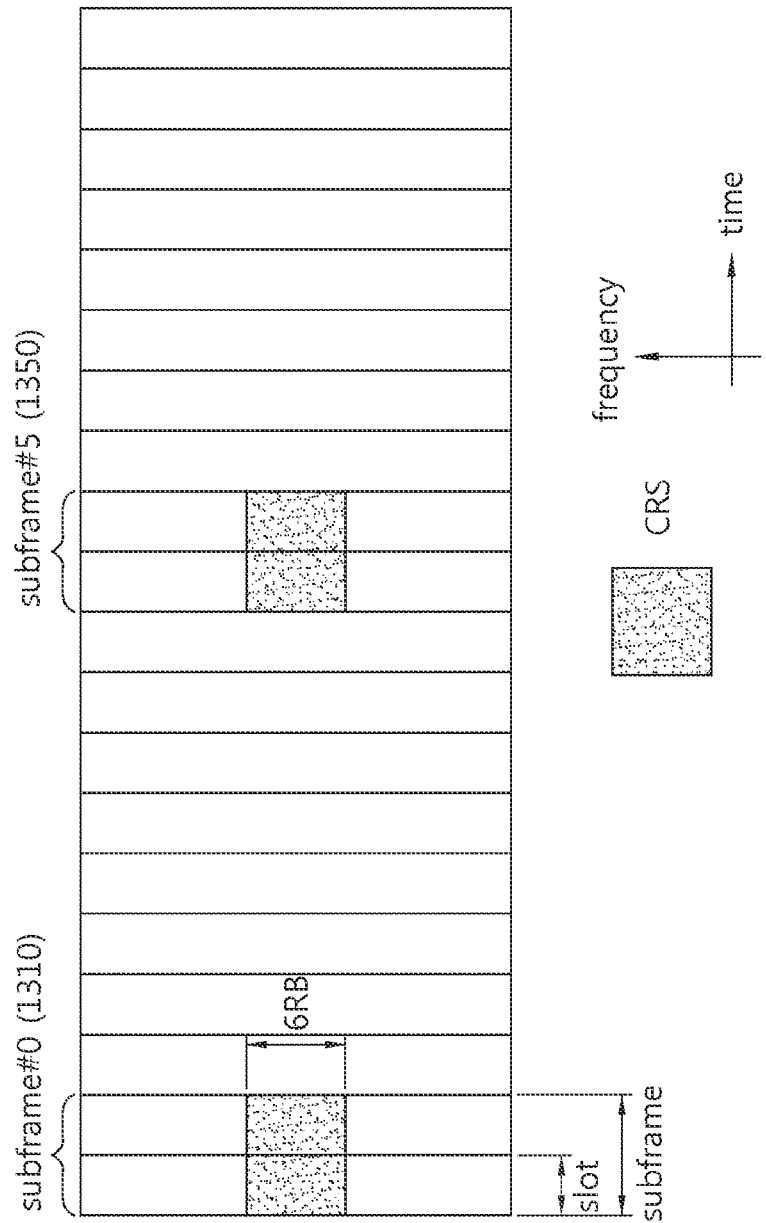
FIG. 13 illustrates an NCT subframe of an index 4 in which a CRS is configured based on the frequency and time in accordance with an embodiment of the present invention.

FIG. 13 illustrates the NCT subframe of the index 4 in which a CRS is configured based on the frequency and time in accordance with an embodiment of the present invention.

Referring to FIG. 13, in the NCT subframe of the index 4, a CRS transmitted in the control channel of center 6 RBs 1300, including a subframe #0 1310 and a subframe #5 1350, may be defined. The subframe #0 1310, the subframe #5 1350, and the center 6 RBs 1300 are examples of time and frequency bands configured in the NCT subframe of the index 4, and values thereof may be changed.

A frame may include 10 subframes, and the subframes may be indexed by a subframe #0 to a subframe #9, respectively. In the NCT subframe of the index 4, a CRS may be transmitted in the center 6 RBs frequency band 1300 of the subframe #0 1310 and the subframe #5 1350 of the frame. Such a method of sending a CRS may be applied to all subframes of a duplex method using FDD or TDD.

In a subframe and frequency domain in which a CRS is transmitted, both synchronization and tracking may be performed based on the CRS. Furthermore, a control channel included in a subframe in which the CRS is transmitted may be demodulated using both the CRS/DM-RS.

Figure 14:
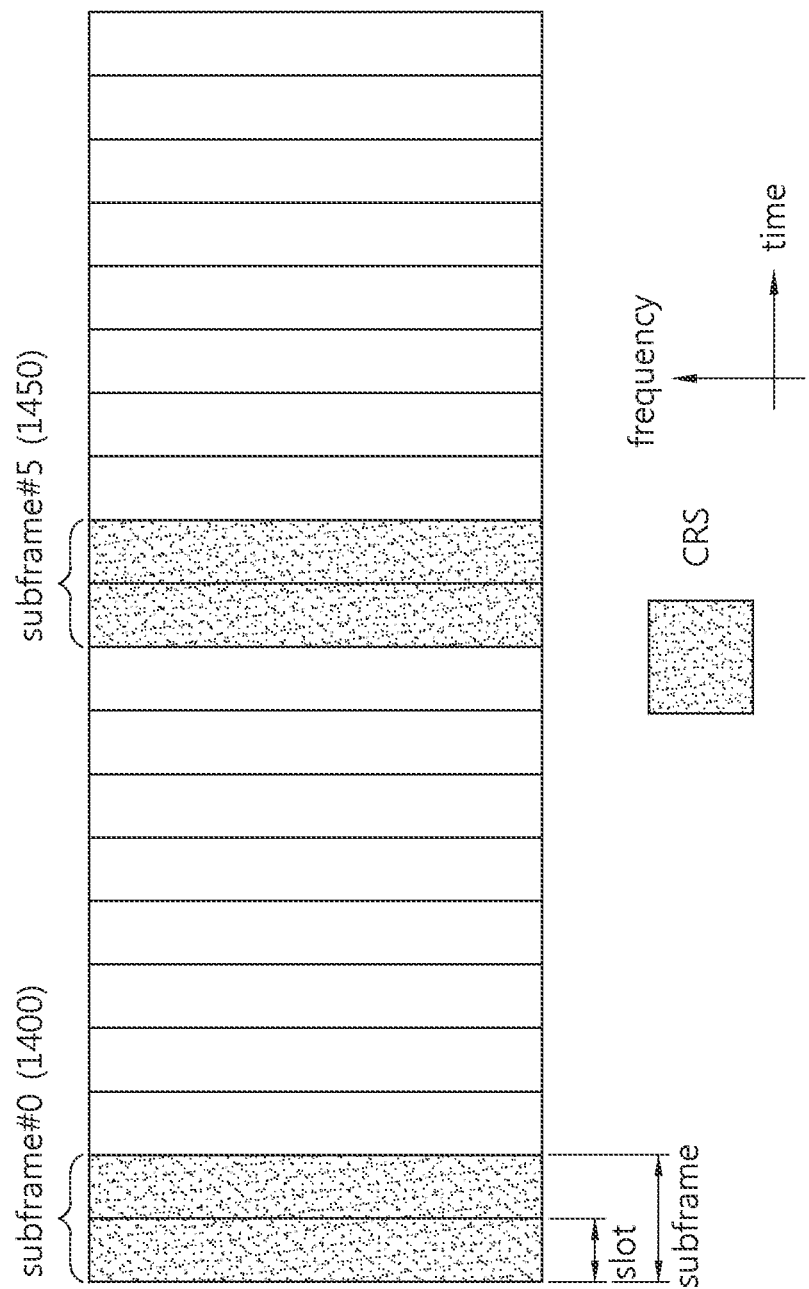
FIG. 14 illustrates an NCT subframe of an index 5 in which a CRS is configured based on the frequency and time in accordance with an embodiment of the present invention.

FIG. 14 illustrates the NCT subframe of the index 5 in which a CRS is configured based on the frequency and time in accordance with an embodiment of the present invention.

Referring to FIG. 14, the NCT subframe of the index 5 is transmitted in a subframe #0 1400 and a subframe #5 1450, wherein a CRS transmitted in the entire system frequency bandwidth may be defined. The subframe #0 1400 and the subframe #5 1450 are examples of set times, and values thereof may be changed.

A method of sending a CRS used in the NCT subframe of the index 5 may be used in a duplex method using FDD or TDD.

As in the NCT subframe of the index 4, in the subframe #0 1400 and the subframe #5 1450 in which the CRS is transmitted, both synchronization and tracking may be performed based on the CRS. Furthermore, control channels allocated to the subframe #0 1400 and the subframe #5 1450 in which the CRS is transmitted may be decoded using both the CRS and a DM-RS. Furthermore, Radio Link Monitoring (RLM)/RRM measurement may be performed based on the CRS or the DM-RS/CSI-RS.

In accordance with an embodiment of the present invention, an NCT subframe needs to support a legacy MBSFN subframe. In the NCT subframe, when a CRS is transmitted, the CRS, together with PDCCH resources, may be allocated to the first OFDM symbol and second OFDM symbol of the subframe and transmitted.

If the NCT subframe of the index 1 described with reference to FIG. 10 is used, the existing UE that performs cell search using a legacy subframe may receive a CRS transmitted in the NCT subframe and perform cell search.

In the aforementioned CRS configurations of the index 0 to index 5 of the NCT subframe, a reference signal included in the NCT subframe has been expressed as a CRS because the CRS configuration includes a reference signal generated using the same sequence as that of the existing CRS. However, the aforementioned methods of sending the CRSs of the index 0 to the index 5 may be performed in some frequency and time resource regions unlike in the existing CRS.

The aforementioned CRS of the index 0 to index 5 of the NCT subframe may be newly defined using a term other than the CRS, for example, a term, such as a tracking reference signal. That is, in the following embodiments of the present invention, a reference signal defined in an NCT subframe is described using a term "CRS", for convenience of description, but a term other than the CRS may be defined and used and such an embodiment is also included in the scope of the present invention.

In the NCT subframe of the index 1, in order to support the existing UE, a synchronization signal, a System Information Block (SIB), and a PBCH may be transmitted in the frequency band of center 6 Resource Blocks (RBs) within a subcarrier, that is, a frequency domain in which an existing CRS is transmitted, as in the existing region to which a synchronization signal and a control channel have been allocated.

In the NCT subframe, the size of a system bandwidth transmitted through a PBCH region may be the size of a frequency bandwidth in which a CRS is transmitted. For example, if a CRS is transmitted only at the location of the center 6 RBs of a system bandwidth, the size of a frequency bandwidth transferred through a PBCH region may be 1.4 MHz, that is, a frequency bandwidth corresponding to the center 6 RBs in which the CRS is transmitted, not an actual entire frequency bandwidth (e.g., 10 MHz).

In such a case, the existing UE may perform Radio Resource Management (RRM) measurement on some of a frequency bandwidth in which a CRS is transmitted, not the entire frequency bandwidth when performing RRM measurement.

Accordingly, when an NCT subframe in which a CRS is transmitted in only some region is used, information about the accurate entire frequency bandwidth needs to be additionally transmitted. In an embodiment of the present invention, information about the entire frequency band may be transmitted by changing a Master Information Block (MIB) data structure transmitted through PBCH resources. The MIB data structure may be changed as in Table 1 below.

Referring to Table 1, in an NCT subframe, information about the size of the entire system bandwidth may be transmitted to UE using an NCT_dl-bandwidth field included in an MIB. The UE may obtain information about the size of the entire system bandwidth using the NCT_dl-bandwidth field included in the MIB and may perform RRM measurement.

Whether or not the existing UE will send and receive data using the NCT subframe of the index 1 may be controlled through a barring mechanism. If the existing UE is able to detect a CRS included in the NCT subframe using the NCT subframe of the index 1 as described above, the existing UE may be able to perform data transmission and reception through the NCT subframe using the legacy PSS/SSS/PBCH design again.

The remaining NCT subframe other than the index 1 does not have backward compatibility with the existing UE because it uses a CRS configuration different from the existing CRS configuration. Accordingly, in the NCT subframe, whether or not inter-cell interference is generated may be taken into consideration in a relationship with a legacy subframe used in an existing legacy cell. For example, when signals and channels, such as a PSS/SSS/PBCH, are allocated in an NCT subframe, a frame structure may be determined so that interference generated due to the NCT subframe is minimized in a legacy cell not using the NCT subframe.

A CRS may be used to decode a PDCCH and to predict a channel. Furthermore, a CRS may be used to decode data including system information, such as SIB 1/2 and PBCH information.

In accordance with an embodiment of the present invention, cell search may be performed based on a limited CRS because the CRS is limited to and transmitted in an NCT subframe. In an NCT subframe, cell search may be performed using an inter-frequency cell measurement method and an intra-frequency cell measurement method using a limited and transmitted CRS.

Furthermore, in an NCT subframe in which a CRS is transmitted with respect to only some subframes, UE may perform RRM measurement only on subframes in which the CRS is transmitted. If an NCT subframe in which a CRS is not transmitted is used, UE needs to be informed that a CRS is not transmitted in a subframe. In the NCT subframe in which the CRS is not transmitted, RRM may be performed based on a DM-RS and a CSI-RS other than the CRS.

Information about a CRS configuration in which an NCT subframe is used, that is, CRS configuration information, may be transmitted to UE through a synchronization signal before system information is transmitted.

In accordance with an embodiment of the present invention, UE may obtain information about a CRS configuration used in an NCT subframe by decoding a synchronization signal, such as a PSS/SSS. The UE may perform RRM and channel prediction based on the CRS configuration information of the NCT subframe obtained through the synchro-

TABLE 1

```
MasterInformationBlock ::= SEQUENCE {
    dl-Bandwidth            ENUMERATED { //to support legacy UE's cell search
                              n6, n15, n25, n50, n75, n100},
    phich-Config            PHICH-Config,
    systemFrameNumber       BIT STRING (SIZE (8)),
    NCT_dl-Bandwidth        ENUMERATED { //to support NCT system bandwidth
                              n6, n15, n25, n50, n75, n100,
    spare                   BIT STRING (SIZE (7))
}
``` nization signal. Furthermore, the UE may decode channel information based on an obtained CRS configuration pattern.

A cell in which an NCT subframe is used may be assumed to be an SCell allocated to UE through only a legacy cell that uses a legacy subframe. In such a case, the legacy cell may notify the UE of information about the CRS configuration of the NCT subframe used in the SCell. In another method, the information about the CRS configuration of the NCT subframe may be transmitted to the UE through a signal, such as a PSS/SSS transmitted in the NCT subframe.

The following embodiment of the present invention discloses a method of sending information about the CRS configuration of an NCT subframe to UE through a PSS/SSS transmitted in the NCT subframe.

(1) A Method of Sending Information about a CRS Configuration Using the Number of Symbols Between Symbols Including an SSS and Symbols Including a PSS.

The locations where the PSS and the SSS are transmitted, defined in the release 10 LTE specification, are an OFDM symbol #5 (SSS) and an OFDM symbol #6 (PSS) in the first slot of a subframe #0 and an OFDM symbol #5 (SSS) and an OFDM symbol #6 (PSS) in the first slot of a subframe #5.

In accordance with an embodiment of the present invention, the index of a symbol in which an SSS is transmitted in an NCT subframe may be a value obtained by subtracting the index of the CRS configuration of the NCT subframe from the index of a symbol in which a PSS is transmitted. The index of the CRS configuration may be the index of the aforementioned NCT subframe or may be an index according to the CRS pattern configuration of a newly configured NCT subframe. That is, the index of the CRS configuration of the NCT subframe is not limited to those of the embodiments described with reference to FIGS. 2 to 6. A method of calculating the index of a CRS configuration based on the locations of OFDM symbols in which a PSS and an SSS are transmitted is a single example. In a method of deriving information about a CRS configuration in accordance with an embodiment of the present invention, UE may derive information about a CRS configuration using another method based on a PSS and an SSS, and such an embodiment is also included in the scope of the present invention.

Figure 15:
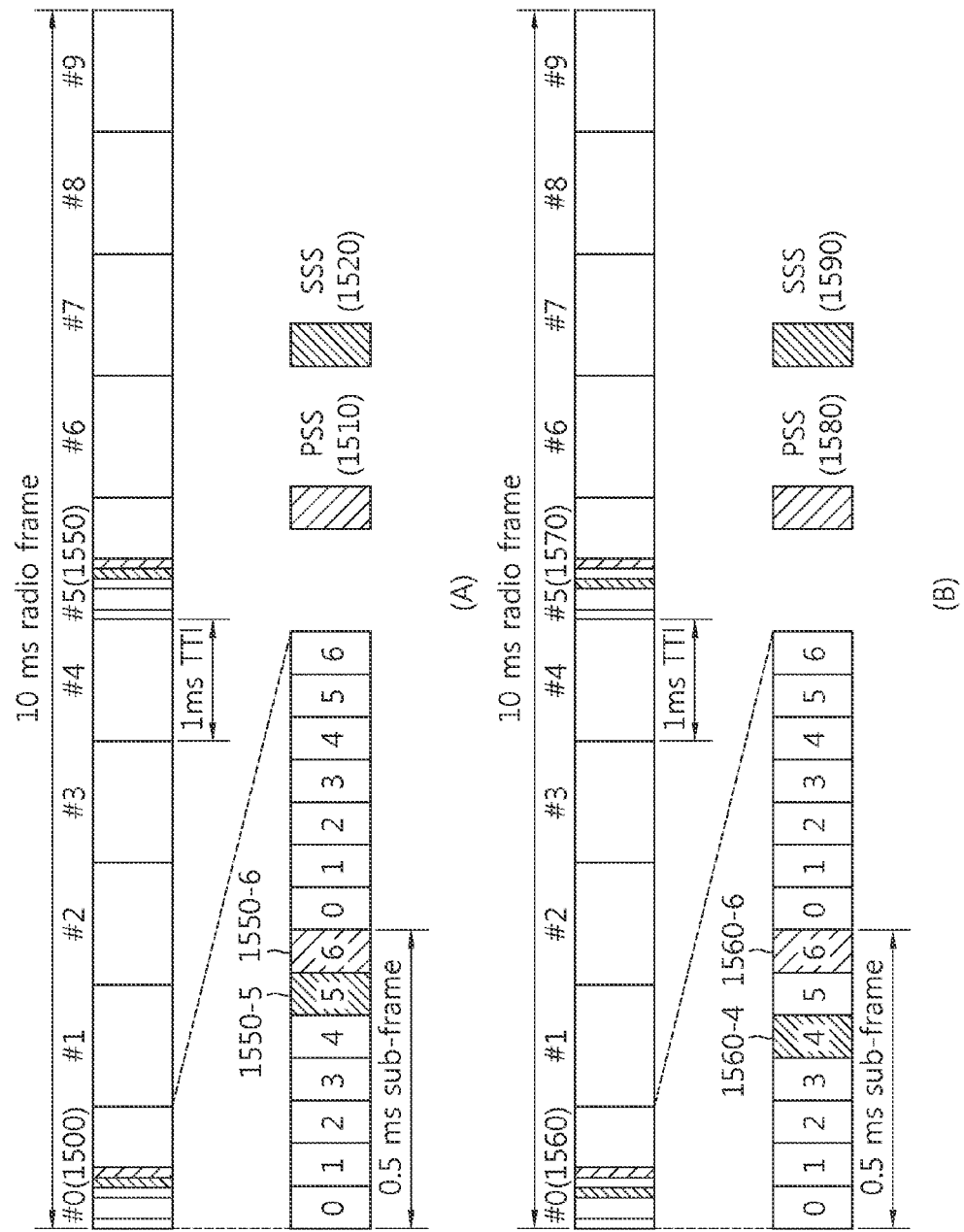
FIG. 15 is a conceptual diagram illustrating a method of sending the index of a CRS configuration in accordance with an embodiment of the present invention.

FIG. 15 is a conceptual diagram illustrating a method of sending the index of a CRS configuration in accordance with an embodiment of the present invention.

Referring to FIG. 15(A), if the index of a CRS configuration is 1, a difference between the index of a symbol in which an SSS 1520 is transmitted and the index of a symbol in which a PSS 1510 is transmitted may be configured to be 1, and the PSS 1510 and the SSS 1520 may be transmitted. Accordingly, an OFDM symbol #5 (SSS) 1550-5 and an OFDM symbol #6 (PSS) 1550-6 may be allocated to the first slot of a subframe #0 1500 and an OFDM symbol #5 (SSS) and an OFDM symbol #6 (PSS) may be allocated to the first slot of a subframe #5 1550 using the same method as an existing method of sending the PSS 1510/SSS 1520, and the PSS and the SSS may be transmitted.

For another example, referring to FIG. 15(B), if the index of a CRS configuration is 2, a difference between the index of a symbol in which an SSS 1590 is transmitted and the index of a symbol in which a PSS 1580 is transmitted may be configured to be 2, and the PSS 1580 and the SSS 1590 may be transmitted. The location of the OFDM symbol (an OFDM symbol #6, 1560-6) in which the PSS 1580 is transmitted is fixed, the location of the OFDM symbol in which the SSS 1590 is transmitted is configured to have a difference of 2 from the location 1560-6 of the OFDM symbol in which the PSS 1580 is transmitted, and an OFDM symbol #4 1560-4 may be configured in each slot.

In FIGS. 15(A) and 15(B), a method of fixing the location where the PSS is transmitted to the location of the OFDM symbol #6 of the first slot and computing a difference between the OFDM symbols in which the PSS and the SSS are transmitted has been illustrated. However, the location of an OFDM symbol and the location of a subframe in which a PSS is transmitted may be changed.

If a method, such as that of FIG. 15, is used, when the index of a CRS configuration is 0, information about the CRS configuration is unable to be transmitted based on a difference between a PSS and an SSS. If the index of the CRS configuration is 0, the PSS and the SSS may be transmitted using another method.

Figure 16:
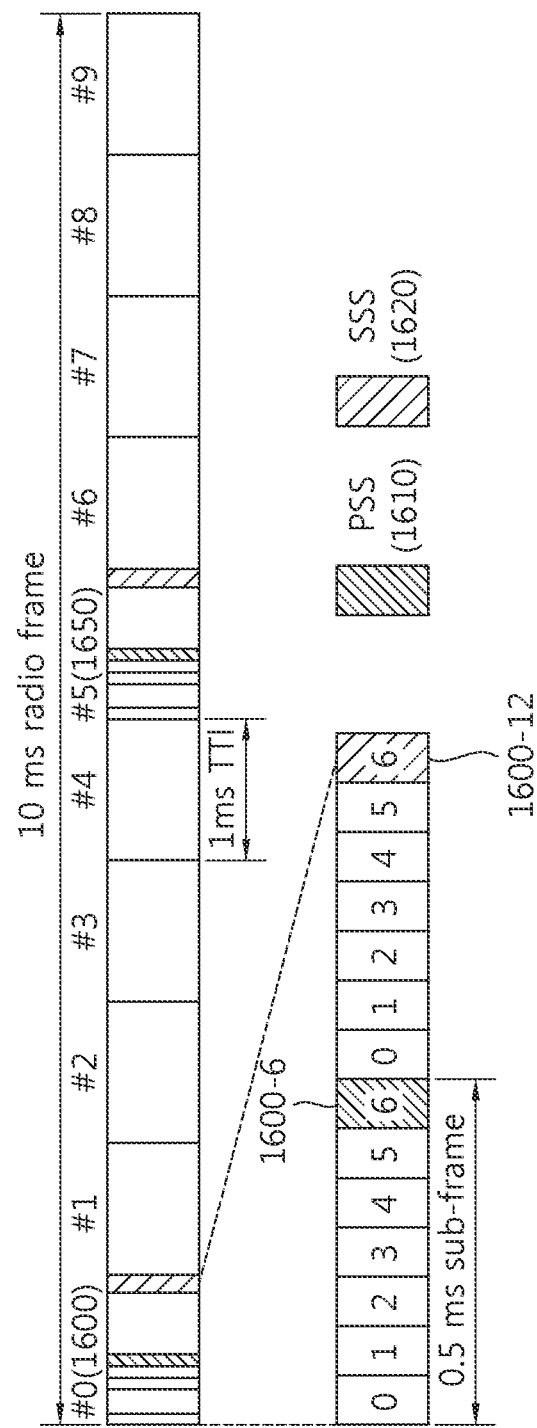
FIG. 16 is a conceptual diagram illustrating a method of configuring a CRS in accordance with an embodiment of the present invention.

FIG. 16 is a conceptual diagram illustrating a method of configuring a CRS in accordance with an embodiment of the present invention.

FIG. 16 discloses a method of sending a PSS 1610 and an SSS 1620 if the index of a CRS configuration is 0.

Referring to FIG. 16, if the index of the CRS configuration is 0, the index of a symbol 1600-12 in which the SSS is transmitted and the index of a symbol 1600-6 in which the PSS is transmitted have the same index, but the SSS and the PSS may be transmitted in different slots. For example, the PSS 1610 may be transmitted in the OFDM symbol #6 1600-6 of a first slot, and the SSS 1620 may be transmitted in the OFDM symbol #6 1600-12 of a second slot within the same subframe. That is, the PSS 1610 and the SSS 1620 may be included in the respective OFDM symbols that have the same index in different slots of the same subframe in order to indicate that the index of the CRS configuration of an NCT subframe is 0.

As described above, the location of a subframe and the location of an OFDM symbol in which the PSS/SSS is transmitted may be changed. If an NCT subframe does not support legacy UE, the location of a subframe in which a CRS and a PSS/SSS are transmitted may be changed from the existing subframe #0 and the existing subframe #5 to another location (e.g., a subframe #1 and a subframe #7).

In another embodiment, information about the index of a CRS configuration may be transmitted based on a difference between the PRB index of an OFDM symbol in which a PSS is transmitted and the PRB index of an OFDM symbol in which an SSS is transmitted.

For example, it may be assumed that a PSS is transmitted in an OFDM symbol #5 and an SSS is transmitted in an OFDM symbol #6. In this case, if the index of a resource block in which the PSS is transmitted is 5 and the index of a resource block in which the SSS is transmitted is a PRB index of 4, 1, that is, a difference between the indices of the two resource blocks, may be determined to be the index of a CRS configuration.

In addition to using synchronization signals, such as a PSS and an SSS, the following method (2) may be used as a method of sending information about the CRS configuration of an NCT subframe to UE.

(2) A Method of Sending Information about the Index of a CRS Configuration Through a Method of Sending an Additional Synchronization Signal.

Figure 17:
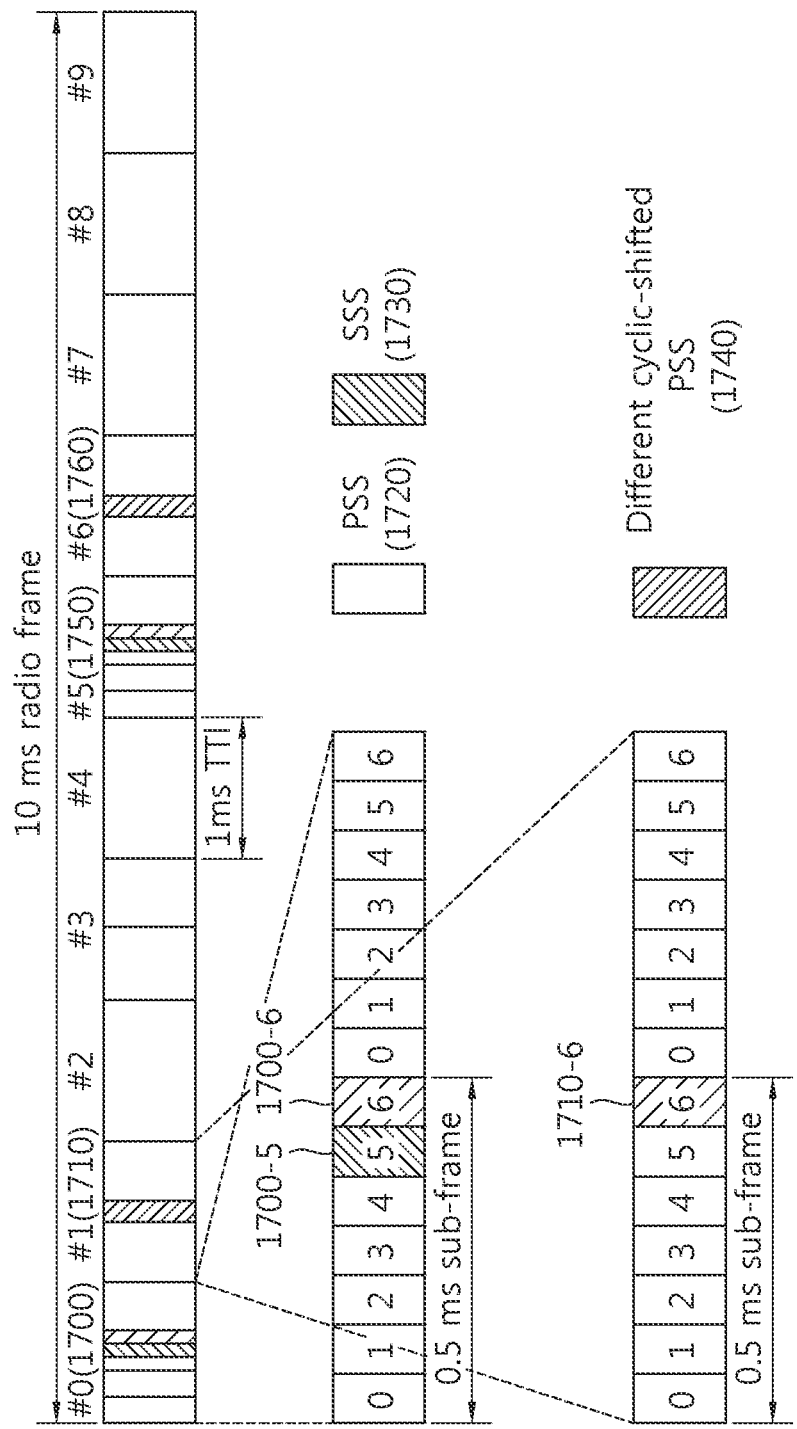
FIG. 17 is a conceptual diagram illustrating a method of sending an additional synchronization signal in accordance with an embodiment of the present invention.

FIG. 17 is a conceptual diagram illustrating a method of sending an additional synchronization signal in accordance with an embodiment of the present invention.

An additional synchronization signal 1740 may be defined as a newly defined signal that performs synchronization other than a PSS 1720/SSS 1730. Accordingly, if the additional synchronization signal 1740 is used, UE may perform the same cell search method as that of the existing release 10 LTE specification in performing cell search.

Referring to FIG. 17, the additional synchronization signal 1740 including information about a CRS configuration may be transmitted at the location of an OFDM symbol different from that of an OFDM symbol that includes resources to which the PSS 1720/SSS 1730 are allocated. For example, the additional synchronization signal 1740 may be transmitted in a subframe 1710, 1760 next to a subframe 1700, 1750 in which a PSS 1720/SSS 1730 is transmitted or may be transmitted in the same subframe 1700, 1750 as a subframe in which the PSS 1720/SSS 1730 is transmitted, but may be allocated to different resource elements and transmitted.

If information about the index of a CRS configuration is transmitted by sending the additional synchronization signal 1740, a frame structure in which the existing PSS 1720/SSS 1730 is transmitted may not be changed.

That is, if the additional synchronization signal 1740 is used, UE may search for a cell through the same cell search method as an existing method regardless of whether or not the UE supports an NCT subframe. The additional synchronization signal 1740 that is additionally transmitted other than the PSS 1720/SSS 1730 may be transmitted in another subframe 1710, 1760, for example, other than a subframe #0 1700 and a subframe #5 1750 that are subframes in which the PSS 1720/SSS 1730 are transmitted.

In accordance with an embodiment of the present invention, information about the index of a CRS configuration may be transmitted based on various cyclic shifts applied to the additional synchronization signal 1740. UE may receive the additional synchronization signal 1740 and detect information about the index of the CRS configuration of an NCT subframe based on information about the cyclic shift of the additional synchronization signal 1740.

The additional synchronization signal 1740 may be transmitted in a frequency range smaller than 6 RBs because a main object of the additional synchronization signal 1740 is to send information about the index of a CRS configuration. For example, the additional synchronization signal 1740 may be transmitted in a frequency band corresponding to the center 2 RBs of the subframe #0 1700, that is, every first subframe of a frame.

Another method of sending the index of the CRS configuration of an NCT subframe to UE may include the following method (3).

(3) A Method of Sending the Index of a CRS Configuration Based on Information about the Group of a Cell ID A method of detecting the index of a CRS configuration based on information about a cell ID set may be used as another method of sending the index of the CRS configuration of an NCT subframe to UE. For example, if a retrieved cell ID set is between 0 and 5, the index of a CRS configuration may be inferred to be 0. If a retrieved cell ID set is between 6 and 10, the index of a CRS configuration may be inferred to be 1. That is, if UE obtains information about a cell ID by mapping the index of a CRS configuration based on information about a retrieved cell ID, the UE may infer the index of the CRS configuration based on the cell ID information.

If an NCT subframe does not support legacy UE, a cell ID set using the NCT subframe may be limited to a specific group and used. Such a limited cell ID can prevent legacy UE from performing unnecessary cell search because the legacy UE does not need to search for a cell ID set using an NCT subframe when performing cell search.

The following method (4) may be used as yet another method of sending the index of the CRS configuration of an NCT subframe to UE.

(4) A Method of Sending Information about a CRS Configuration Using a PBCH/MIB.

In yet another method of sending the index of the CRS configuration of an NCT subframe, a BS may send the index of a CRS configuration to UE using PBCH data and/or an MIB. The PBCH may be demodulated using a DM-RS instead of a CRS.

Table 2 below indicates an MIB transmitted through PBCH information.

TABLE 2

```
MasterInformationBlock ::= SEQUENCE {
    dl-Bandwidth            ENUMERATED { //to support legacy UE's cell search
                                n6, n15, n25, n50, n75, n100),
    phich-Config            PHICH-Config,
    systemFrameNumber       BIT STRING (SIZE (8)),
    NCT_CRS-ConfIndex       ENUMERATED { //to support NCT CRS Configuration
                                0, 1, 2, 3},
    NCT_dl-Bandwidth        ENUMERATED { //to support NCT system bandwidth
                                n6, n15, n25, n50, n75, n100},
    spare                   BIT STRING (SIZE (5))
}
```

Referring to Table 2, NCT_CRS-confIndex may be included in information about an MIB. NCT_CRS-confIndex included in the information about the MIB may include information about the index of a CRS configuration. UE may receive information about a CRS configuration based on the MIB transmitted through the PBCH.

The following method (5) may be used as still another method of sending the index of the CRS configuration of an NCT subframe to UE.

(5) A Method of Sending Information about a CRS Configuration Based on a Neighboring Legacy Cell.

In still another method of sending the index of a CRS configuration, information about a CRS configuration may be transmitted to UE using a neighboring legacy cell. A list in which the cell ID of a cell in which an NCT subframe placed nearby is used and the index of a CRS configuration are mapped to the system information of a subframe transmitted by a legacy cell may be transmitted. UE may obtain information about the index of the CRS configuration of an NCT subframe that is used in a current cell based on information transmitted by a surrounding legacy cell and the identity of a current cell in which an NCT subframe is used.

That is, a legacy cell may send information about the location of resources to which a CRS has been allocated to UE included in a cell that uses an NCT subframe. A CRS pattern may have various patterns not a fixed pattern depending on CRS resource configuration information transmitted by a legacy cell.

UE which sends and receives data using an NCT subframe may decode a System Information Block (SIB), included in a subframe transmitted by a legacy cell, based on a System Information RNTI for NCT advertisement (NCT-SI-RNTI), that is, a newly defined Radio Network Temporary Identifier (RNTI).

If a method, such as (5), is used, UE may preferentially perform cell search based on a legacy cell. If UE selects a candidate legacy cell to be accessed, the UE may receive required system information before it attempts RRC access. UE that performs access to an NCT cell in which an NCT subframe is used may access an NCT cell based on system information received from a legacy cell.

The method (5) may be applied in order for UE to search for an NCT cell to which handover will be performed if the UE performs handover from a legacy cell to the NCT cell. If UE performs handover from a legacy cell to an NCT cell, information about the index of the CRS configuration of an NCT subframe may be transmitted from the legacy cell to the UE through RRC signaling.

The following embodiment of the present invention discloses an initial access method of UE according to the index of a CRS configuration.

The index of a CRS configuration below is the same as the index of a CRS configuration described with reference to FIGS. 2 to 6.

(1) An Initial Access Method of UE if the Index of a CRS Configuration is 0

Figure 18:
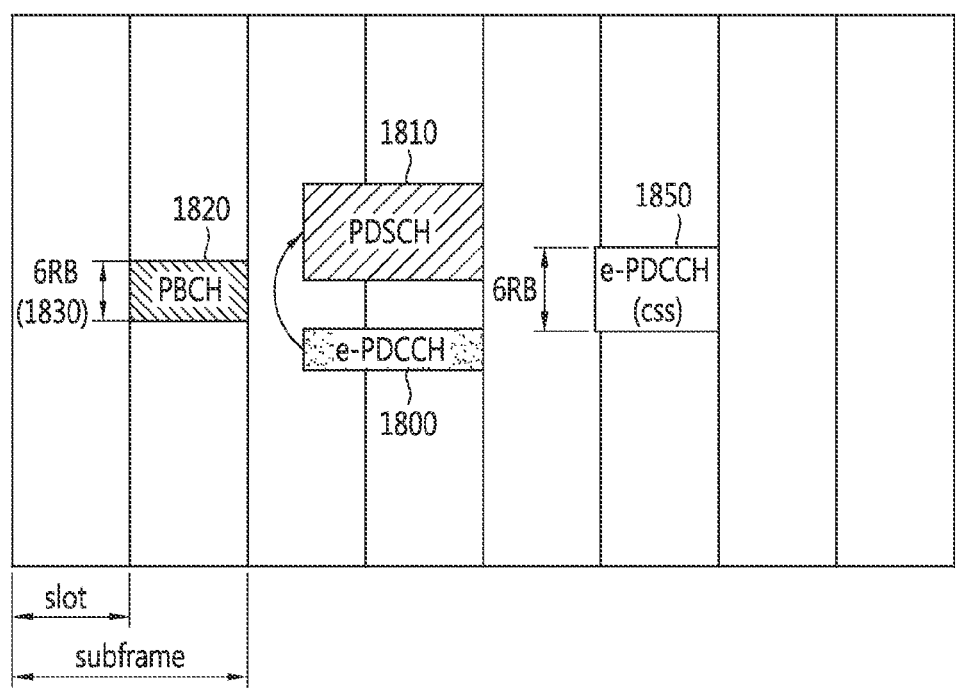
FIG. 18 is a conceptual diagram illustrating an NCT subframe having the index 0 of a CRS configuration in accordance with an embodiment of the present invention.

FIG. 18 is a conceptual diagram illustrating an NCT subframe having the index 0 of a CRS configuration in accordance with an embodiment of the present invention.

FIG. 18 discloses a method of performing random access based on an NCT subframe having the index 0 of a CRS configuration.

Referring to FIG. 18, a CRS is not transmitted in an NCT subframe having the index 0 of a CRS configuration. In the NCT subframe of the index 0 of the CRS configuration, control information for UE may be transmitted through an e-PDCCH region 1800. The UE may decode data, transmitted in the e-PDCCH region 1800, using a DM-RS and/or a CSI-RS.

A PBCH region 1820 included in the NCT subframe of the index 0 of the CRS configuration may include information for decoding an SIB 1 and an SIB 2. UE may decode data, transmitted in the PBCH region 1820, using a DM-RS instead of a CRS. The SIB 1 may include information about whether or not UE is permitted to camp on a cell, and the SIB 2 may include information that is necessary for the UE to access the cell.

A PDSCH 1810 scheduled through the e-PDCCH data 1800 may include the SIB 1 and the SIB 2. In order to schedule the PDSCH 1810, including the SIB 1 and the SIB 2, through the e-PDCCH data 1800, a Common Search Space (CSS) may be defined in the e-PDCCH 1800.

A CSS and a UE-specific Search Space (USS) on which UE performs monitoring may be included in the e-PDCCH region 1800. A search space is divided into a CSS and a USS. The CSS may be a region in which common control information (this is also called cell-specific control information) is transmitted, and the USS may be a region in which UE-specific control information is transmitted.

Some region (e.g., an e-PDCCH region 1850 of a frequency band allocated to center 6 RBs) of the e-PDCCH region of the NCT subframe is a CSS and may be configured to be a space in which common control information for pieces of UE is transmitted. The CSS may be allocated to another frequency band in addition to a frequency band allocated to center 6 RBs 1830, and such an embodiment is also included in the scope of the present invention.

In order for UE to perform random access in a cell that sends and receives an NCT subframe having the index 0 of a CRS configuration, the UE may receive a Random Access Response (RAR) through the UE-specific e-PDCCH region 1850 and PDSCH region 1810 scheduled through a region that is included in the e-PDCCH region and that has been defined as a CSS.

(2) An Initial Access Method of UE if the Index of a CRS Configuration is 1

If the index of a CRS configuration is 1, UE may perform synchronization and tracking using a CRS. Furthermore, the UE may decode data, transmitted through each channel, using a CRS and a DM-RS.

Figure 19:
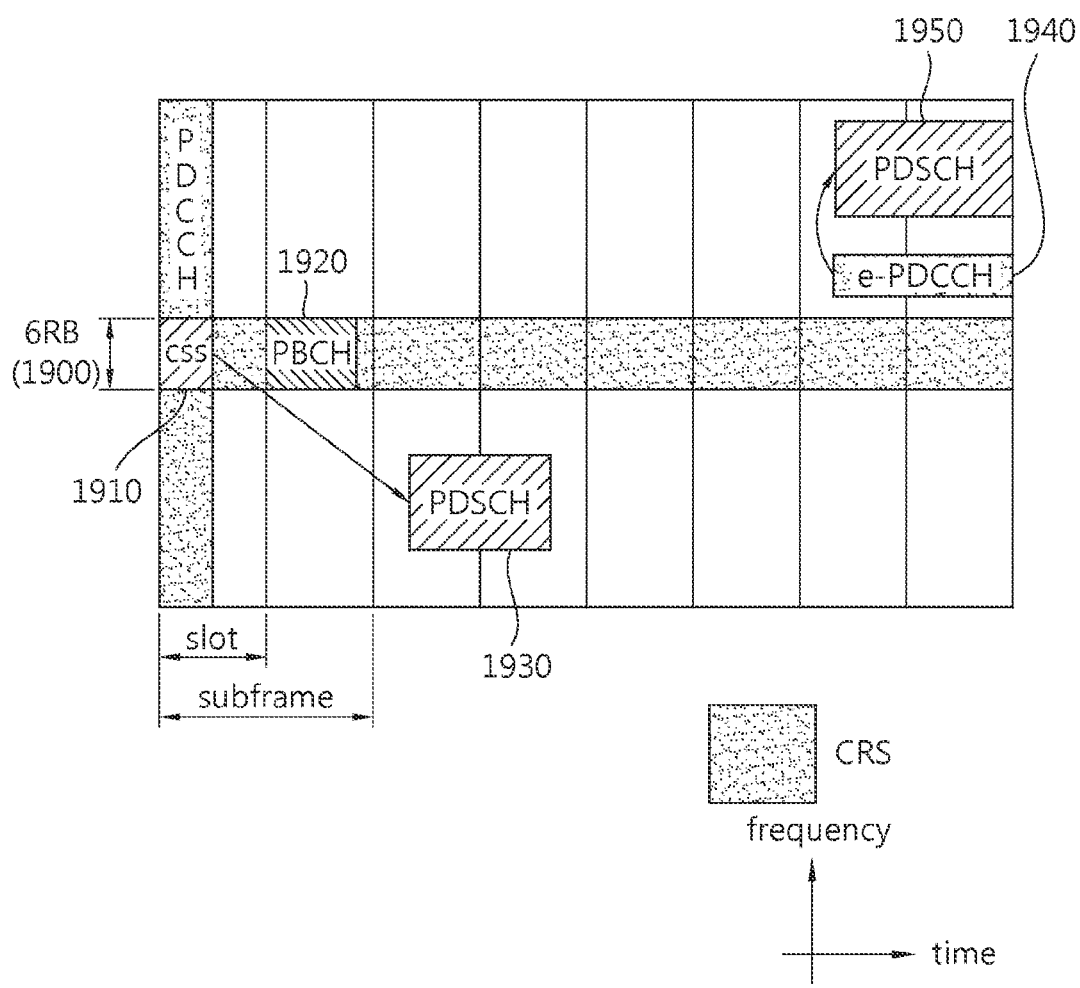
FIG. 19 is a conceptual diagram illustrating an NCT subframe having the index 1 of a CRS configuration in accordance with an embodiment of the present invention.

FIG. 19 is a conceptual diagram illustrating an NCT subframe having the index 1 of a CRS configuration in accordance with an embodiment of the present invention.

FIG. 19 discloses a method of performing random access based on an NCT subframe having the index 1 of a CRS configuration.

Referring to FIG. 19, RRM measurement by UE may be performed based on a CRS. For example, UE may perform RRM measurement on a frequency band corresponding to center 6 RBs 1900 in which a CRS is transmitted. The UE may perform additional RRM measurement based on a Channel State Information-Reference Signal (CSI-RS) on the remaining frequency bands other than the center 6 RBs band, if necessary.

A PBCH region 1920 included in the NCT subframe of the index 1 of the CRS configuration may be allocated to the same location as the location of a legacy subframe to which a PBCH is allocated. The PBCH region 1920 allocated to the NCT subframe may include information for decoding an SIB 1 and an SIB 2.

Various methods may be used to send the SIB 1 and the SIB 2 through the NCT subframe of the index 1 of the CRS configuration. In a first method, UE may schedule a PDSCH region in which the SIB 1 and the SIB 2 are transmitted using only PDCCH information 1910 placed in center 6 RBs 1900. The UE may use the PDCCH resources 1910, placed in the center 6 RBs, as only a Common Search Space (CSS) in order to schedule a PDSCH region 1930 in which the SIB 1 and the SIB 2 are transmitted.

If the first method is used, the PDCCH region 1910 of the center 6 RBs may be configured to be a CSS and may be used as a region for scheduling a region in which the SIB 1 and the SIB 2 are transmitted. UE may perform blind search only on the CSS of the PDCCH region 1910 of the center 6 RBs and receive the SIB 1 and the SIB 2 in the scheduled PDSCH region 1930.

In another method for sending the SIB 1 and the SIB 2, the PDSCH region in which the SIB 1 and the SIB 2 are transmitted may be scheduled in the CSS of an e-PDCCH region 1940 and transmitted.

In order for UE to perform random access on a cell that uses the NCT subframe of the index 1 of the CRS configuration, the UE may use the CSS 1910 of the PDCCH resources placed in the center 6 RBs. A Random Access Response (RAR), that is, a response to the random access request of UE, may be transmitted through the specific e-PDCCH region 1940 and PDSCH region 1950 scheduled through the CSS 1910 of the PDCCH resources placed in the center 6 RBs of the NCT subframe of the index 1 of the CRS configuration.

(3) An Initial Access Method of UE if the Index of a CRS Configuration is 2 or 3

FIG. 20 is a conceptual diagram illustrating an NCT subframe having the index 2 or 3 of a CRS configuration in accordance with an embodiment of the present invention.

FIG. 20 discloses a method of performing random access based on an NCT subframe having the index 2 or 3 of a CRS configuration.

Referring to FIG. 20, if an index 2 or index 3 is used as the index of the CRS configuration of an NCT subframe, a CRS may be transmitted in another frequency band 2010 other than center 6 RBs 2000.

In the NCT subframe of the index 2 of the CRS configuration, PBCH resources 2020 may be allocated to the same resource region as a resource region in which a CRS is transmitted and an MIB may be transmitted. A PDSCH region 2040 in which an SIB 1 and an SIB 2 are transmitted may be scheduled through a CSS 2030 included in a PDCCH region that is transmitted in the region including the CRS. Furthermore, a random access response may be included in the PDSCH region 2040 scheduled through the PDCCH resources of the region in which the CRS is transmitted and may be transmitted to UE.

(4) An Initial Access Method of UE if the Index of a CRS Configuration is 4

If the index 4 is used as a CRS configuration method, a CRS may be transmitted only in a specific subframe (e.g., a subframe #0 and a subframe #5).

Figure 21:
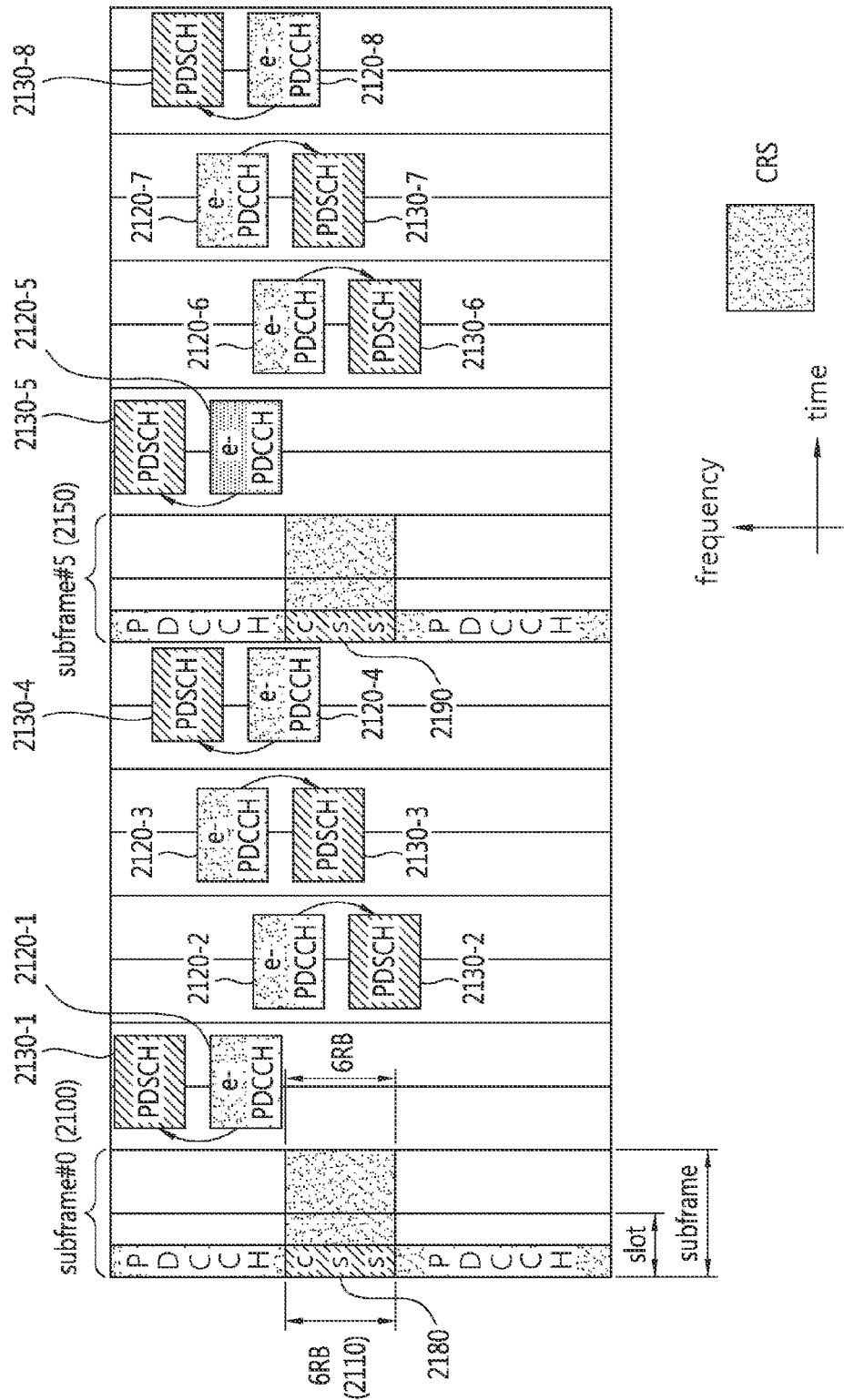
FIG. 21 is a conceptual diagram illustrating an NCT subframe having the index 4 of a CRS configuration in accordance with an embodiment of the present invention.

FIG. 21 is a conceptual diagram illustrating an NCT subframe of the index 4 of a CRS configuration in accordance with an embodiment of the present invention.

FIG. 21 discloses a method of performing random access based on the NCT subframe of the index 4 of the CRS configuration.

Referring to FIG. 21, if the index 4 is used as the index of the CRS configuration of an NCT subframe, a CRS transmitted in some frequency bands (e.g., the frequency bands of the center 6 RBs 2110 of a subframe #0 2100 and a subframe #5 2150) of specific subframes may be defined.

In the NCT subframe of the index 4 of the CRS configuration, a CSS 2180, 2190 may be defined in a region in which the CRS of the subframe#0 2100 or the subframe #5 2150 in which the CRS is transmitted is transmitted. The subframe #0 2100 or the subframe #5 2150 may include a PDCCH region. Only the CSS 2180, 2190 may be defined in the PDCCH region of the subframe #0 2100 or the subframe #5 2150 in which the CRS is transmitted, and blind decoding may be performed on the PDCCH region. The NCT subframe of the index 4 of the CRS configuration may simplify an ACK/NACK procedure because only the CSS 2180, 2190 is defined in the PDCCH region. A PUSCH region may be granted or UE-specific PDSCH regions 2130-1 to 2130-8 and an ACK/NACK resource region may be scheduled using only e-PDCCH data 2120-1 to 2120-8.

The NCT subframe of the index 4 of the CRS configuration may include all the e-PDCCH regions 2120-1 to 2120-8. In the e-PDCCH regions 2120-1 to 2120-8, all the cell-specific PDSCHs and UE-specific PDSCHs 2130-1 to 2130-8 may be scheduled. System information or a random access response may be scheduled through a PDCCH included in a subframe in which a CRS is transmitted. For example, if a CRS is transmitted in the subframe #0 2100 or the subframe #5 2150, UE may receive a random access response scheduled by the PDCCH include in the subframe #0 2100 or the subframe #5 2150.

(5) If the Index 5 is Used as a Method of Configuring a CRS

Figure 22:
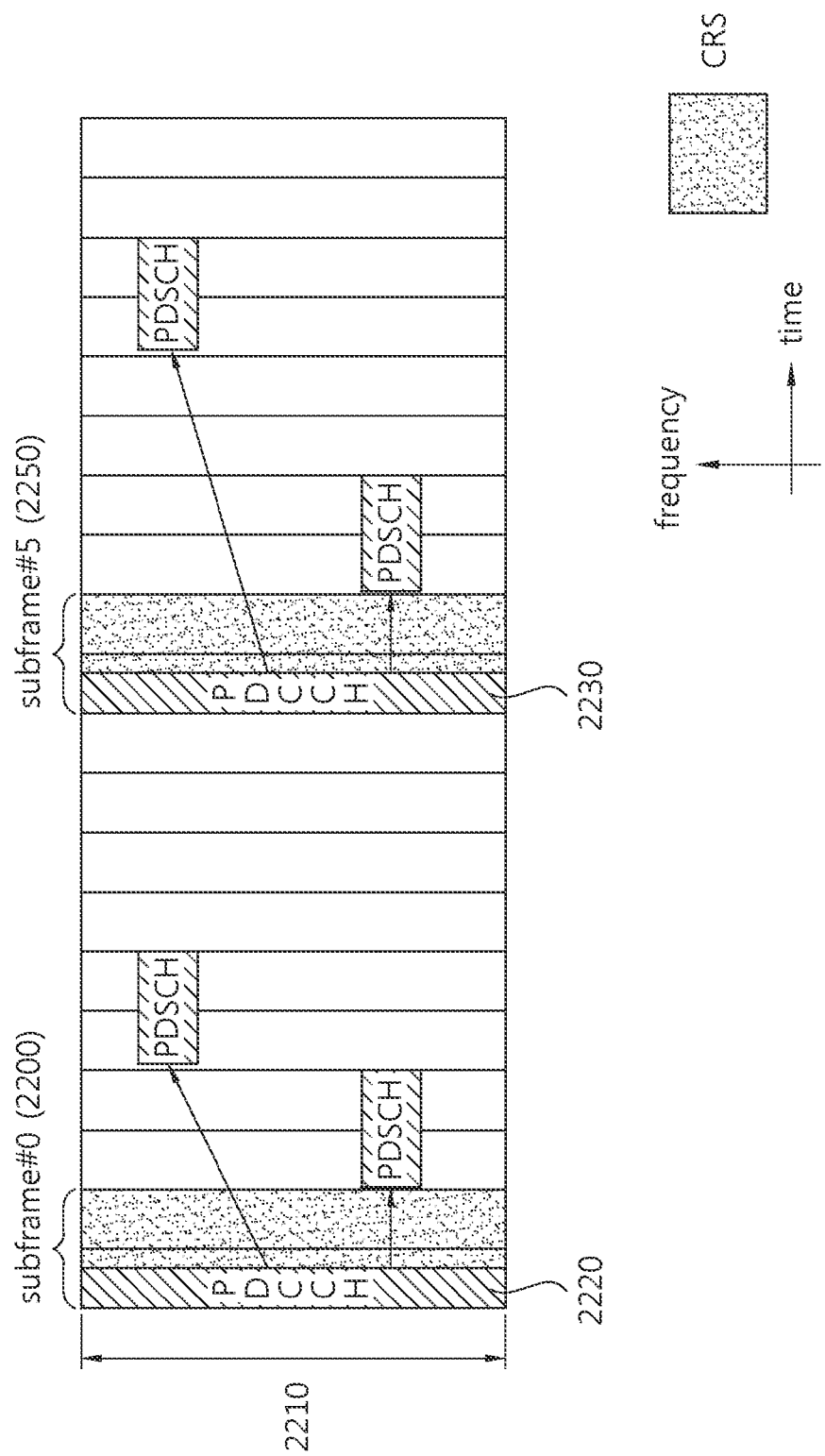
FIG. 22 is a conceptual diagram illustrating an NCT subframe having the index 5 of a CRS configuration in accordance with an embodiment of the present invention.

FIG. 22 is a conceptual diagram illustrating an NCT subframe having the index 5 of a CRS configuration in accordance with an embodiment of the present invention.

FIG. 22 discloses a method of performing random access based on the NCT subframe of the index 4 of the CRS configuration.

Referring to FIG. 22, a CRS transmitted in the entire frequency band of some subframes 2200, 2250 may be defined in the NCT subframe of the index 5. For example, the CRS is transmitted in the subframe #0 2200 and the subframe #5 2250, but may be transmitted in the entire system frequency bandwidth 2210.

For example, if the index 5 is used as the index of the CRS configuration of an NCT subframe, both a user search region and a CSS may be defined in and allocated to the PDCCH region 2220, 2230 transmitted in the subframe #0 2200 and the subframe #5 2250 because the CRS is transmitted in the entire bandwidth 2210.

Various pieces of information, such as an uplink scheduling grant, downlink assignment, and transmit power control, may be transmitted through the CSS and user search region of the PDCCH region 2220, 2230 allocated to the subframe #0 2200 and the subframe #5 2250, that is, subframes in which a CRS is transmitted.

The subframe #0 2200 and the subframe #5 2250, that is, the subframes in which the CRS is transmitted may support other transmission mode other than Transmission Mode (TM) 7 to 9.

UE may be driven in an environment in which a frequency band using an NCT subframe and a frequency band using a legacy subframe are separately included. For example, UE may use a frequency band in which a frequency band using an NCT subframe and a frequency band using a legacy subframe are subjected to a carrier aggregation. For another example, UE may perform handover from a cell in which a legacy subframe is used to an NCT cell in which an NCT subframe is used. In such a case, in order for UE to use frequency bands using different frame formats, a method of sending a CRS transmitted in an NCT subframe and performing synchronization and time/frequency tracking needs to be optimized.

A carrier aggregation is described in brief. In an LTE-A system, a plurality of Component Carriers (CCs) may be aggregated and used. A frequency band in which an aggregation is performed may be divided into a Primary Component Carrier (PCC) and a Secondary Component Carrier (SCC) depending on the role of the frequency band.

The PCC is a frequency band in which data may be transmitted, a cell ID may be obtained, system information may be transmitted, and a physical control signal may be transmitted. Access to a single CC and the transmission and reception of a control signal and data are possible in the PCC. The SCC is a frequency band in which the transmission and reception of data are possible only when the SCC is aggregated with the PCC.

In a data transmission and reception method using a carrier aggregation, the time synch of frames, that is, synchronization information about frames transmitted and received in the SCC, are assumed to be basically identical with the time sync of frames transmitted and received in a PCC.

However, a plurality of frequency bands having different propagation characteristics may be aggregated as in the case where the frequency bands of a PCC and an SCC, that is, aggregated frequency bands, are spaced apart from each other. In such a case, since it is difficult to assume that the time sync of the PCC is identical with the time sync of the SCC, the synchronization of the uplink/downlink signals of frames transmitted in an SCC band may be severely influenced.

As described above, in an NCT subframe, unlike in a legacy subframe, a CRS may not be included in each subframe. That is, if a frequency band in which an NCT subframe is transmitted is an SCC, there may be a problem in synchronization if a control signal and/or synchronization signal is simplified in the NCT subframe transmitted in an SCC band.

Accordingly, an optimization scheme is required to send a CRS in an NCT subframe. If such a method is used, the entire carrier aggregation performance and capacity can be increased.

A signaling optimization method in accordance with an embodiment of the present invention may also be applied to a case where an NCT subframe is sorely used as in FIGS. 2 to 14.

In the following embodiment of the present invention, if a subframe that is included in an NCT subframe and in which a CRS is transmitted is specified, the subframe in which the CRS is included and transmitted is called a CRS subframe. Various CRS configurations may be used in a CRS subframe in order to send a CRS.

The configuration of a default CRS may be used n an NCT subframe in accordance with an embodiment of the present invention. In the configuration of the default CRS, a CRS region (a CRS subframe index, the location of an RE to which a CRS has been allocated in a CRS subframe) to which the CRS has been allocated may be previously configured. If the configuration of the default CRS is used, UE may receive an NCT subframe although the UE is unaware of a cell ID and may perform initial cell search and neighboring cell search. The initial cell search procedure of UE in a cell in which FDD is used as a duplex method may be performed through the following 4 steps.

(1) A slot boundary and information about $N_{ID}^{(2)}$ are obtained by searching for a PSS, that is, a synchronization signal included in an NCT subframe. $N_{ID}^{(2)}$ is information for searching a cell ID group for a cell ID.

(2) Information about a frame boundary and information about $N_{ID}^{(1)}$ are obtained by searching for an SSS, that is, a synchronization signal included in the NCT subframe. $N_{ID}^{(1)}$ is information for searching the cell ID group.

(3) A cell having the strongest signal is searched for through RRM measurement.

(4) Data transmitted through a PBCH region allocated to the NCT subframe is demodulated in order to obtain system information through the NCT subframe transmitted in a corresponding cell.

If a cell ID is not given, neighboring cell search or RRM measurement on a neighboring cell may be performed through (1) to (3) or (4). If a cell ID is given, the processes (1) and (2), that is, processes of searching for a cell ID in a neighboring cell search procedure may be omitted and not performed.

In order to perform initial cell search and neighboring cell search, a PSS, an SSS, and a CRS need to be transmitted unless other signals are not used. The location of frequency/time resources allocated as a region in which a PSS/SSS are transmitted needs to be previously determined. The PSS/SSS may be transmitted in the same region as resource region defined in the existing LTE-10 specification.

The following embodiment of the present invention discloses a CRS configuration defined in an NCT subframe. In the NCT subframe, initial cell search and RRM measurement on a neighboring cell may be performed based on the defined CRS configuration.

FIG. 23 is a conceptual diagram illustrating the configuration of a default CRS in accordance with an embodiment of the present invention.

Referring to FIG. 23(A), in the configuration of the default CRS, a subframe #0 2300 and a subframe #5 2350 may be configured to be CRS subframes. The configuration of the default CRS may be a frequency band corresponding to center 6 RBs 2310 of a frequency band in which a CRS is transmitted.

FIG. 23(B) illustrates the location of resources in which a CRS is transmitted in a Resource Block Pair (PRB) when the default CRS is configured.

FIG. 23 is one of the embodiments of the configuration of a default CRS that is possible for FDD/TDD. If at least one of the following three conditions is satisfied, the configuration of the default CRS of FIG. 23 may be used as the configuration of a default CRS.

(1) In order to support inter-frequency measurement, at least one CRS subframe needs to be transmitted within 6 ms after a CRS subframe is transmitted.

(2) If PBCH data is used for the initial cell search of UE, the CRS may be included in a subframe to which a PBCH region has been allocated and may be transmitted.

(3) In order to support inter-frequency measurement, the CRS may be included in a region corresponding to the 6 RBs of a subframe in which a PSS/SSS are transmitted and may be transmitted.

In accordance with an embodiment of the present invention, a CRS may be used for UE to perform time/frequency tracking and to demodulate data transmitted through a channel. If only the configuration of a default CRS is used in an NCT subframe, data may be demodulated using an additional signal, such as a user-specific RS.

If the number of CRSs included in an NCT subframe is limited, the tracking performance of UE may be deteriorated in an interference environment. An NCT subframe may be basically used in a femto cell or a pico cell. A frequency band between a femto cell and a micro cell may be shared. Furthermore, a femto cell and a pico cell may also share the same frequency band. In such a frequency environment, inter-cell interference may be increased. Accordingly, a method of avoiding inter-cell interference that may affect tracking performance needs to be applied to an NCT subframe.

The deterioration of tracking performance of UE may be increased because CRSs frequently collide again each other according to an increase in the number of NCT cells that share the same center frequency region.

(1) Method 1: A Method of Sending a CRS Using Different Times (Subframes)

If FDD is assumed to be used as a duplex method, a collision between CRSs included in NCT subframes transmitted in respective NCT cells may be reduced using different offsets. For example, an NCT subframe transmitted in each NCT cell may include a CRS in a different subframe location.

Figure 24:
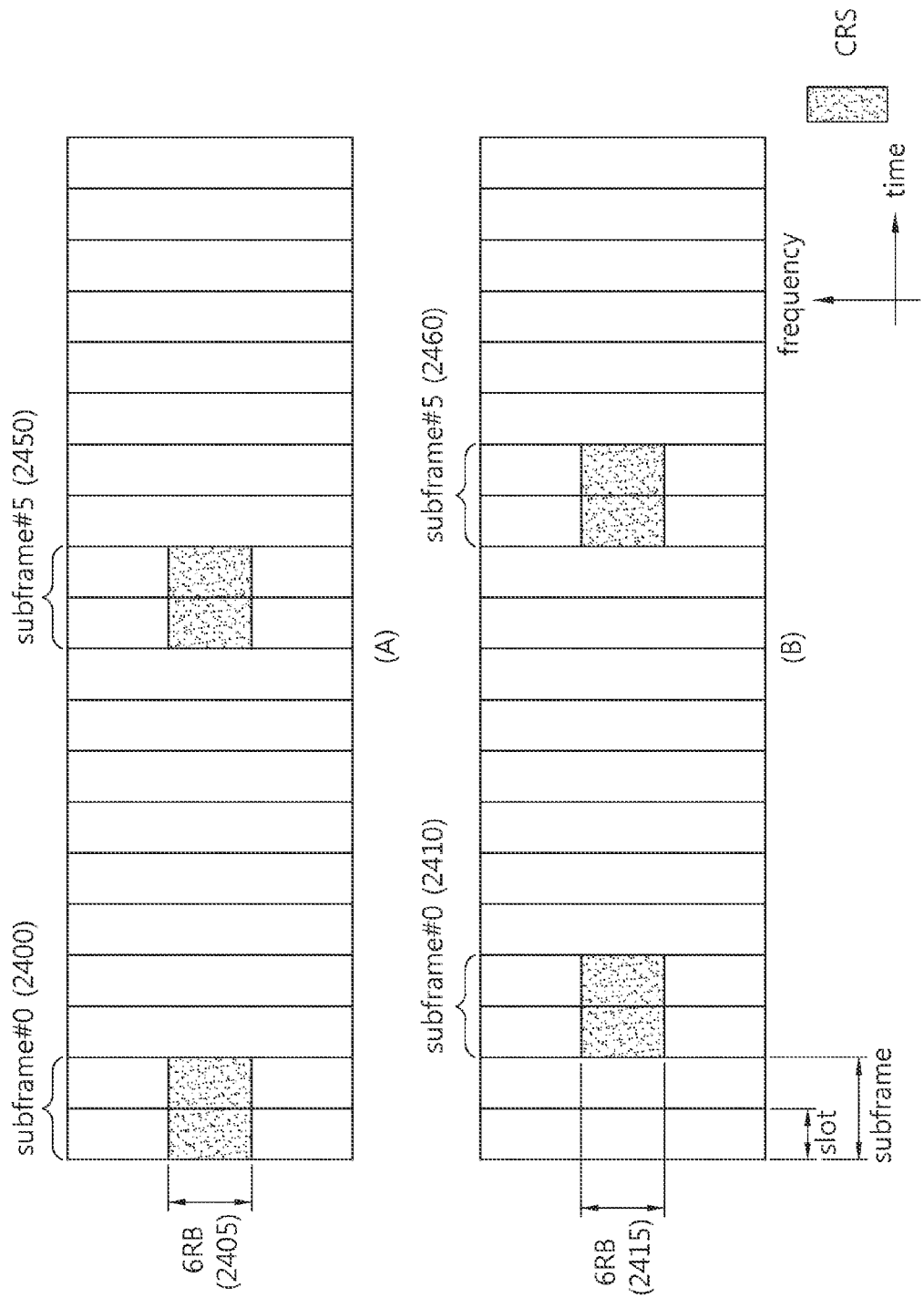
FIG. 24 is a conceptual diagram illustrating a method of sending CRSs in accordance with an embodiment of the present invention.

FIG. 24 is a conceptual diagram illustrating a method of sending CRSs in accordance with an embodiment of the present invention.

Referring to FIG. 24, if cells are assumed to have been synchronized, a collision between CRSs can be prevented by setting different CRS transmission offsets for the cells.

For example, as in FIG. 24(A), a single NCT cell may send CRSs using a subframe #0 2400 and a subframe #5 2450 as CRS subframes.

In such a case, as in FIG. 24(B), another cell sets other subframes (e.g., a subframe #1 2410 and a subframe #6 2460 if an offset 1 is applied) not the subframe #0 and the subframe #5 as CRS subframes and send CRSs. The CRS subframes and the offset value are illustrative, and other subframes may be used as CRS subframes or another CRS transmission offset may be set.

In order to effectively support initial cell search and neighboring RRM measurement when a different CRS transmission offset is used, the CRS transmission offset may be determined based on a cell ID. For example, the CRS transmission offset may have the same value as $N_{ID}^{(2)}$. For example, if $N_{ID}^{(2)}$ is 0, the CRS transmission offset may be set to 0 and the CRSs may be transmitted in the subframe #0 2400 and the subframe #5 2450. If $N_{ID}^{(2)}$ is 1, the CRS transmission offset may be set to 1 and the CRSs may be transmitted in the subframe #1 2410 and the subframe #6 2460. If $N_{ID}^{(2)}$ is 2, the CRS transmission offset may be set to 2 and the CRSs may be transmitted in a subframe #2 and the subframe #7.

The role of a PSS/SSS, that is, a synchronization signal, is important in order to solve inter-cell interference. In order to improve the reliability of the PSS/SSS, the PSS/SSS may be transmitted in the same subframe as a CRS subframe in which a CRS is transmitted. That is, an NCT subframe may be included in the CRS subframe that is varied depending on the size of a CRS transmission offset when the PSS/SSS is transmitted. Information about the location where the PSS/SSS is transmitted may be transmitted to UE. For example, UE may be notified of the location where a PSS/SSS is transmitted on a subframe by notifying the UE whether or not a cell type is an NCT cell.

For example, if UE is notified of information indicative that a current cell is an NCT cell, the UE may estimate information about the location of a CRS subframe and the location where a PSS/SSS has been allocated based on $N_{ID}^{(2)}$ and may further estimate the boundary of frames.

(2) Method 2: A Method of Sending CRSs Using Different Frequency Bands.

In another method of avoiding a collision between CRSs, each NCT cell may configure a frequency subband in which a CRS is transmitted. For example, a frequency subband corresponding to 6 PRBs may be defined and used as a frequency band in which a CRS is transmitted by each NCT cell.

Figure 25:
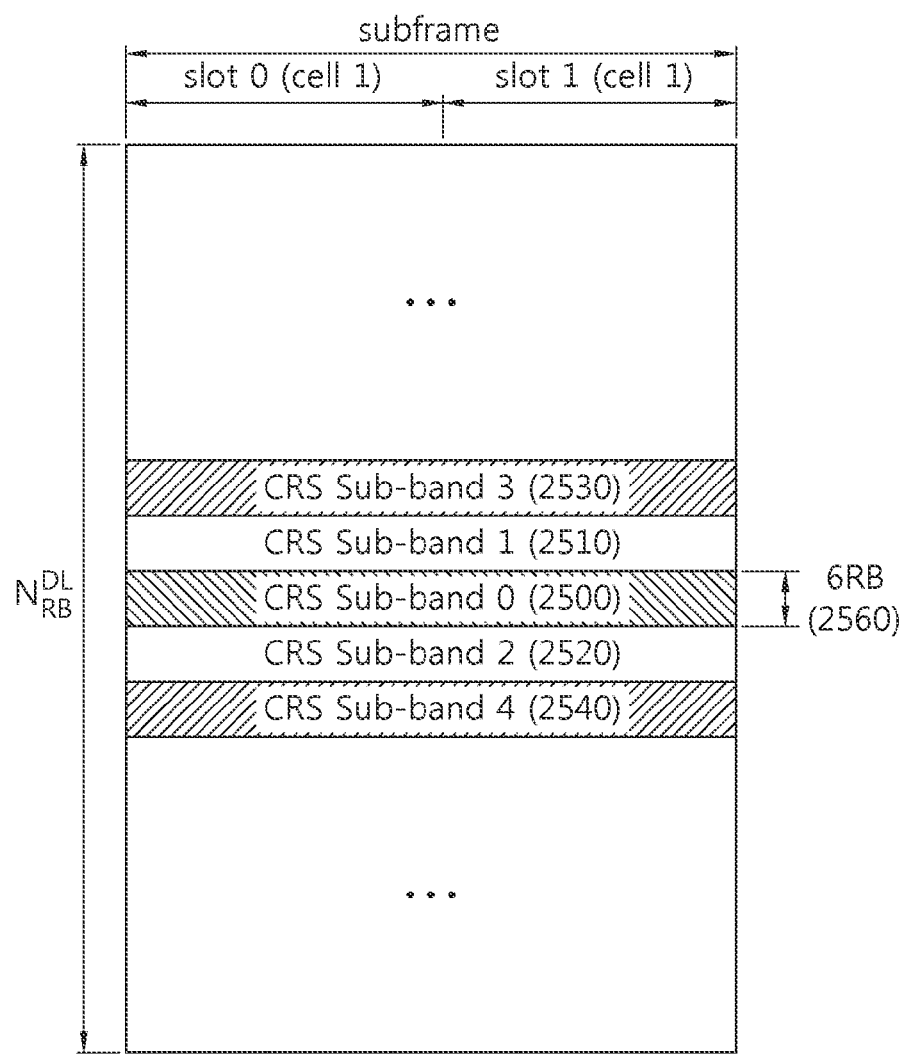
FIG. 25 is a conceptual diagram illustrating subbands in which CRSs are transmitted in accordance with an embodiment of the present invention.

FIG. 25 is a conceptual diagram illustrating subbands in which CRSs are transmitted in accordance with an embodiment of the present invention.

Referring to FIG. 25, the entire system bandwidth may include contiguous subband not overlapped.

A plurality of CRS subbands 2500, 2510, 2520, 2530, and 2540 including a frequency domain corresponding to 6 RBs 2560 may be defined. Each NCT cell may select a different CRS subband for sending a CRS based on each cell ID. In order to avoid interference, the center frequency of each NCT cell may be changed based on each cell ID in order to demodulate a PSS/SSS.

For example, it may be assumed that in Method 2, 3 CRS subbands 2500, 2510, and 2520 are supported and the indices of the CRS subbands are 0 2500, 1 2510, and 2 2520, respectively. In such a case, UE may obtain information about the indices of the CRS subbands 2500, 2510, and 2520 based on $N_{ID}^{(2)}$. That is, the indices of the CRS subbands 2500, 2510, and 2520 in which the CRSs are transmitted may be the same as the value of $N_{ID}^{(2)}$ retrieved through a PSS. For example, if $N_{ID}^{(2)}$ is 0, the index of a CRS subband may be 0.

Although each NCT cell changes the location of resources in which a CRS is transmitted, a collision between PSSs/SSSs transmitted through respective NCT subframes may not be avoided. In a method of configuring an NCT subframe in accordance with an embodiment of the present invention, the location of a frequency band in which a PSS/SSS is transmitted may be changed in order to prevent a collision between the PSSs/SSSs which is generated between NCT subframes transmitted by respective NCT cells. If the location of a frequency band in which a PSS/SSS is transmitted is changed in an NCT subframe, a new frequency band of the frequency band may be set as a center frequency.

Figure 26:
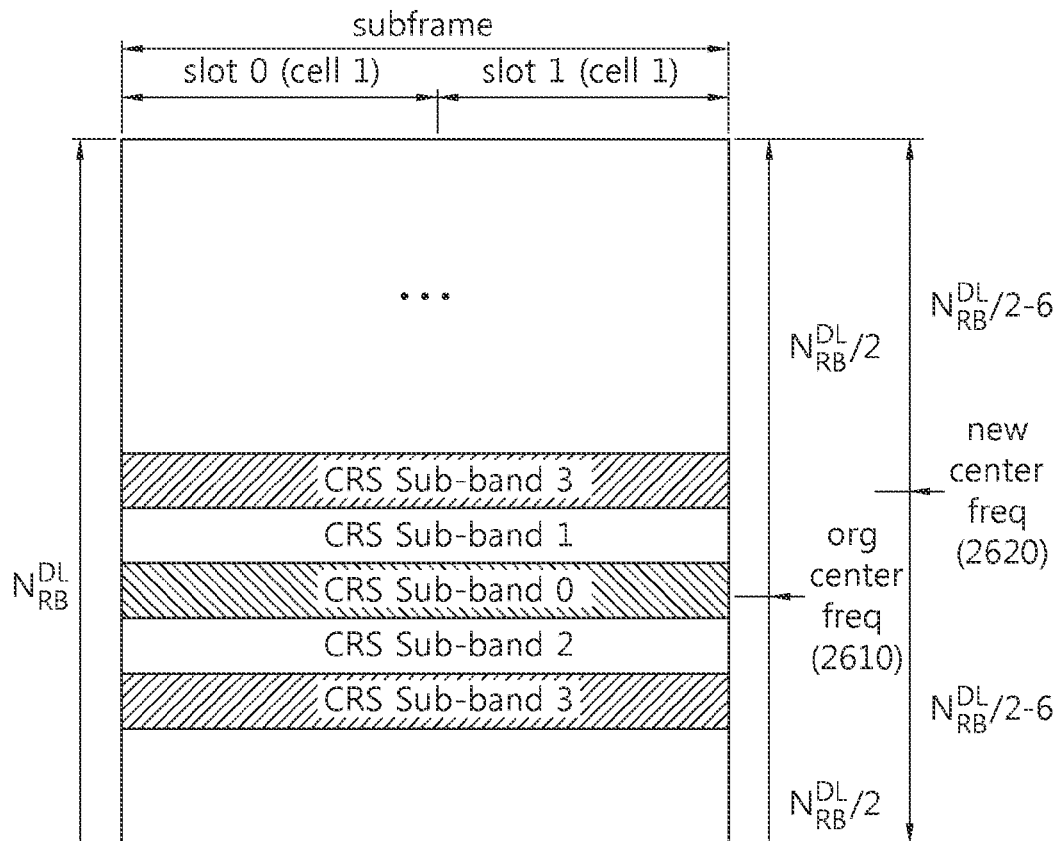
FIG. 26 is a conceptual diagram illustrating a case where subbands in which CRSs are transmitted are configured by moving the location of a frequency used as a center frequency in accordance with an embodiment of the present invention.

FIG. 26 is a conceptual diagram illustrating a case where subbands in which CRSs are transmitted are configured by moving the location of a frequency used as a center frequency in accordance with an embodiment of the present invention.

Referring to FIG. 26, if the center of a frequency axis is moved, the size of an available system bandwidth may be reduced compared to an actual system bandwidth.

For example, if a system bandwidth is 100 RBs and the location of a center frequency is upwardly moved by 6 RBs from a first frequency center 2610 to a second frequency center 2620 on a frequency axis, a frequency bandwidth corresponding to 12 RBs at the bottom is unable to be used.

If the center frequency is moved, a frequency band in which a PSS/SSS is transmitted may be changed accordingly. UE may obtain information related to the movement of a center frequency based on system information for configuring a downlink system bandwidth. Inter-cell interference occurring in many femto cells and pico cells can be prevented and UE can precisely demodulate a PSS/SSS included in an NCT subframe using a method of moving a center frequency and sending the PSS/SSS and a CRS.

As described above, a subband index in which a CRS is transmitted may be determined based on $N_{ID}^{(2)}$ derived from a PSS. If $N_{ID}^{(2)}$ is the same although such a method of selecting a CRS subband is used, however, NCT subframes transmitted by respective cells may have the same CRS configuration. Accordingly, a subband hopping method for randomly configuring the location of a PSS/SSS in which an NCT subframe is transmitted and reducing a collision possibility may be additionally taken into consideration.

Furthermore, the location of a CRS subband may be determined using a combination of Method 1 and Method 2. If the location of a CRS subband is determined using a combination of Method 1 and Method 2, the location of the CRS subband may be determined using $N_{ID}^{(1)}$ Method 1 and $N_{ID}^{(2)}$ in Method 2. That is, information about the index of a subband in which a CRS is transmitted may be derived based on $N_{ID}^{(2)}$, and information about a CRS configuration offset for determining a subframe in which the CRS is transmitted may be derived based on $N_{ID}^{(1)}$.

Figure 27:
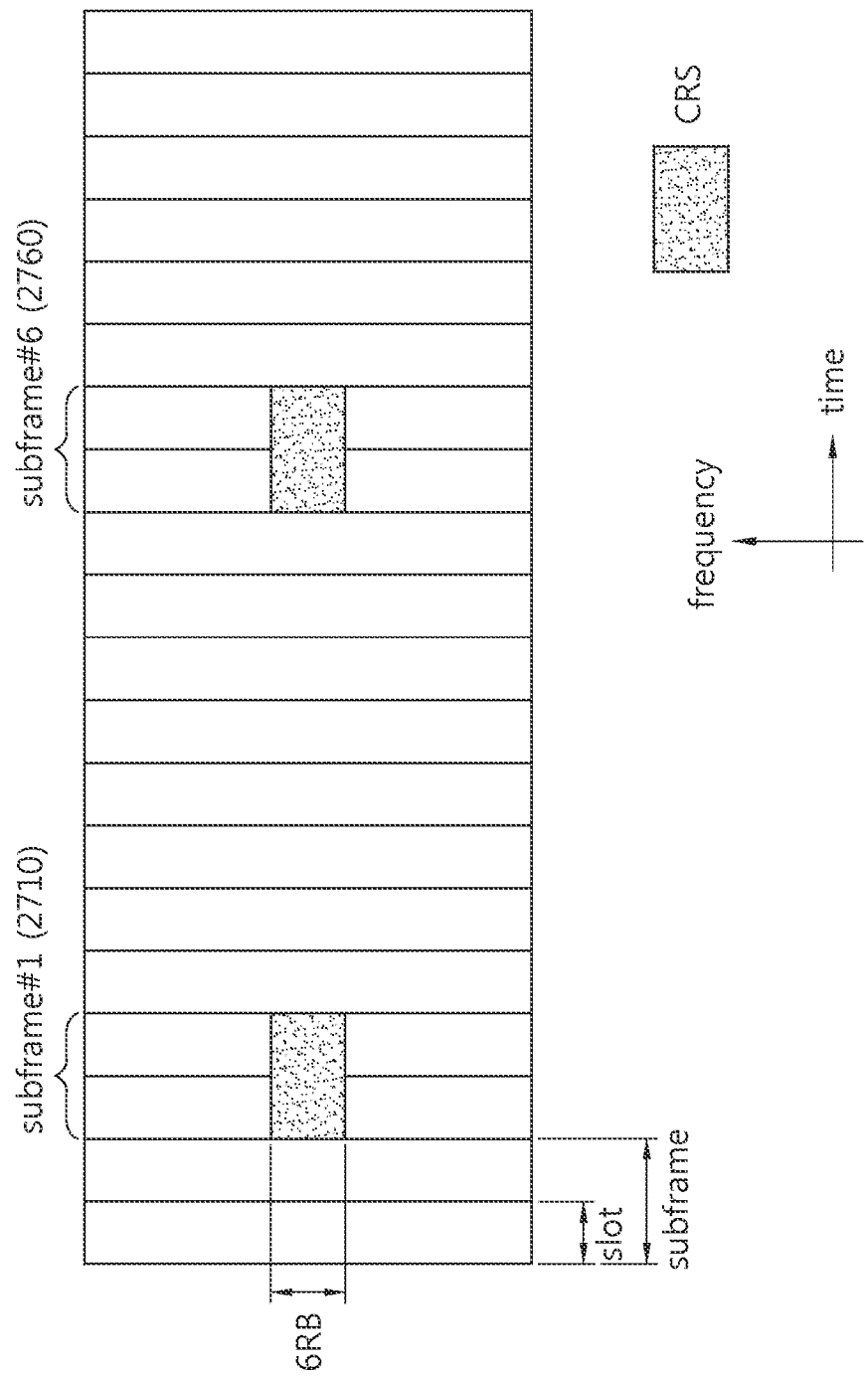
FIG. 27 is a conceptual diagram illustrating a method of sending CRS configuration information in accordance with an embodiment of the present invention.

FIG. 27 is a conceptual diagram illustrating a method of sending information about a CRS configuration in accordance with an embodiment of the present invention.

Referring to FIG. 27, a CRS may be transmitted by combining the method of sending a CRS disclosed in FIG. 24 and the methods of sending a CRS disclosed in FIGS. 25 and 26.

For example, UE may obtain information about a CRS subframe in which a CRS is transmitted by performing mode operation (e.g., $N_{ID}^{(1)}$ mod N, wherein N is 2) on $N_{ID}^{(1)}$ and may obtain information about the index of a subband of the CRS subframe in which the CRS is transmitted using $N_{ID}^{(2)}$.

If the value of $N_{ID}^{(1)}$ is 1, a value, that is, a result of mode operation executed, is set to 1 and a CRS transmission offset is set to 1. As a result, a subframe #1 2710 and a subframe #6 2760 may be configured to be CRS subframes in which CRSs are transmitted. If $N_{ID}^{(2)}$ is 2, a CRS may be transmitted in a CRS subband frequency band in which a CRS subband index is 2.

If a combination of Method 1 and Method 2 is used as a CRS transmission method, UE may determine whether or not a cell type is an NCT cell and obtain information about resources in which a CRS is transmitted. If, as a result of the determination, the cell type is an NCT, the UE may determine a CRS subframe in which the CRS is transmitted and the location of the CRS subframe based on $N_{ID}^{(1)}$ and $N_{ID}^{(2)}$ obtained through a PSS/SSS included in an NCT subframe.

In another method of sending information about a CRS configuration, UE can reduce the possibility of a collision between CRSs transmitted in CRS subframes using a specific parameter (e.g., Vshift). Vshift is a parameter that determines the location of resources where a CRS is placed in a CRS subframe based on a cell ID. That is, when Vshift is changed in the CRS subframe, information about a CRS configuration, that is, the location where the CRS is transmitted, is changed. Accordingly, the possibility of a collision between CRSs included in an NCT subframe and transmitted from respective NCT cells to UE is reduced. The value Vshift of the CRS subframe may be determined to be one of values from 0 to 5.

In order to support initial cell search and neighboring cell search, information about a CRS configuration that is varied based on a cell ID needs to be able to be derived. For example, two CRS subframes may be included in a single frame, and one of specific patterns, such as {1, 1}, {2, 3}, and {0, 4}, may be selected as Vshift used in each of the CRS subframes.

Figure 28:
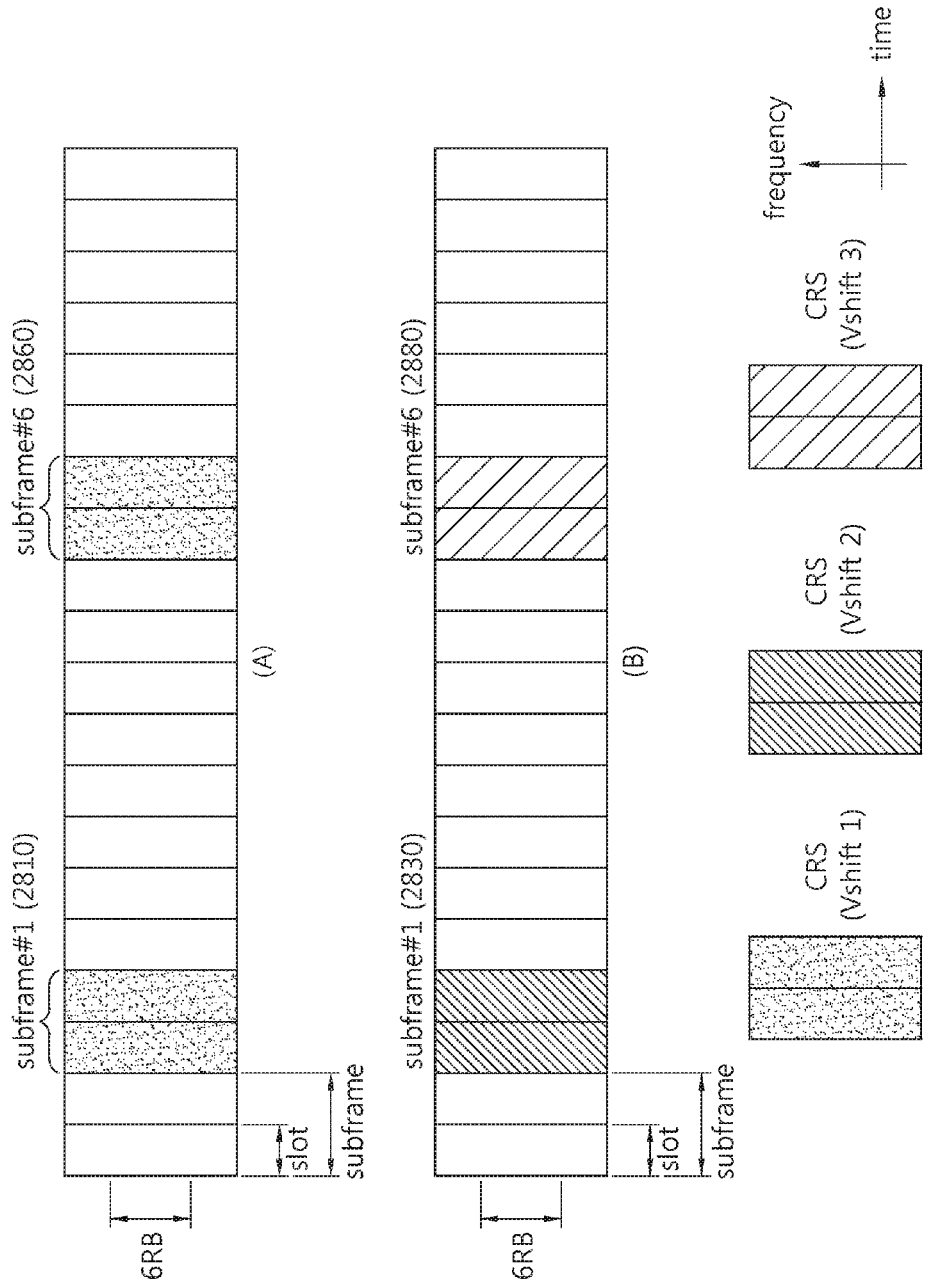
FIG. 28 is a conceptual diagram illustrating a method of sending CRS subframes in accordance with an embodiment of the present invention.

FIG. 28 is a conceptual diagram illustrating a method of sending CRS subframes in accordance with an embodiment of the present invention.

Referring to FIG. 28, frequency hopping patterns used by respective NCT cells when CRS subframes are generated may be assumed to be {1, 1}, {2, 3}, and {0,4}. The frequency hopping pattern may be computed using $N_{ID}^{(1)}$ mod N operation (wherein, N is 3).

Referring to FIG. 28(A), a frame transmitted by a first NCT cell may include a subframe #0 2810 that includes a CRS whose Vshift has been generated as 1 and a subframe #6 2860 that includes a CRS whose Vshift has been generated as 1.

Referring to FIG. 28(B), a frame transmitted by a second NCT cell may include a subframe #1 2830 that includes a CRS whose Vshift has been generated as 2 and a subframe #6 2880 that includes a CRS whose Vshift has been generated as 3. If such a method is used, NCT subframes transmitted by respective cells having the same $N_{ID}^{(2)}$ may be generated with different CRS configurations.

Such a method may also be performed on a plurality of frames. For example, frequency hopping patterns may be defined for three frames transmitted by a single NCT cell in a time domain, and the CRS configuration of a CRS subframe included in each frame may be determined UE may be aware that what Vshift has been used based on a subframe index. If a frequency hopping pattern is extended every frame, Vshift information may be aware based on additional information about the index of the frame.

(3) Method 3: A Method of Maintaining the Configuration of a Default CRS and Configuring an Additional Pattern.

A plurality of pieces of UE included in an HetNet may perform data transmission and reception using an NCT subframe. Various interferences may be generated in terms of the time and frequency with respect to a plurality of pieces of UE supporting an NCT subframe included in an HetNet. In order to improve the tracking performance of a plurality of pieces of UE operating in an HetNet, an additional CRS may be defined in the configuration of a default CRS in an NCT subframe.

Figure 29:
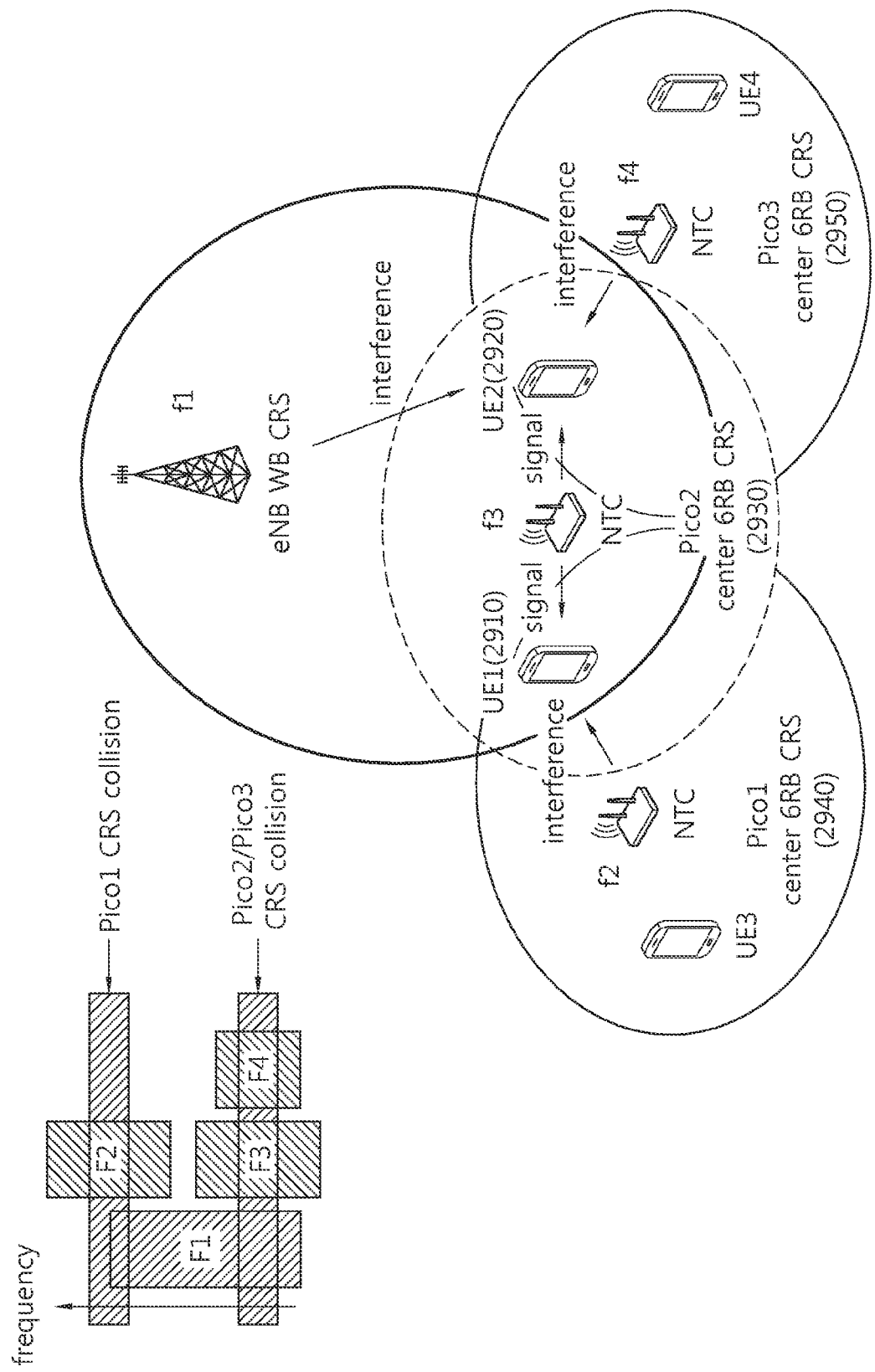
FIG. 29 is a conceptual diagram illustrating UE operating in an HetNet in accordance with an embodiment of the present invention.

FIG. 29 is a conceptual diagram illustrating UE operating in an HetNet in accordance with an embodiment of the present invention.

Referring to FIG. 29, the interference environment of UE1 2910 and the interference environment of UE2 2920 may be different interference environments.

The UE 1 2910 may receive a CRS transmitted in the center 6 RBs of a frequency bandwidth "f3" used in a pico 2 cell 2930, that is, an NCT cell, and may perform synchronization and time/frequency tracking. The frequency band of an NCT subframe transmitted by a pico 1 cell 2940, that is, another NCT cell, is f2 which has a different center frequency band from f3. Accordingly, small interference is generated in the CRS of an NCT subframe transmitted from the pico 2 cell 2930 to the UE1 2910.

The UE2 2920 may receive an NCT subframe from a pico 3 cell 2950, that is, yet another NCT cell. The frequency band of the NCT subframe transmitted by the pico 3 cell 2950 is assumed to be f4. The center frequency band of f4 is overlapped with that of the frequency bandwidth f3 used by the NCT subframe transmitted by the pico 2 cell 2930.

The UE2 2920 may experience interference attributable to the NCT subframe transmitted by the pico 2 cell 2930. In such a case, in order to reduce interference generated in the UE2 2920, an additional CRS may be transmitted to the UE 2920 so that the deterioration of performance attributable to the interference is prevented. The same concept may be applied to an additional subframe in which a CRS is transmitted.

In order to improve inter-cell interference or support DCI format poll-back, an additional CRS may be transmitted in a CRS subframe in the configuration of a default CRS. An embodiment of the present invention below discloses a method of configuring an additional CRS.

(1) A Method of Increasing a Frequency Bandwidth in which a CRS is Transmitted and Sending an Additional CRS If the configuration of a default CRS is configured to send a CRS only in some frequency bandwidth, an additional CRS may be transmitted in the entire system bandwidth.

For example, if the configuration of a default CRS is assumed to be transmitted in center 6 RBs, a default CRS pattern may be applied to the entire bandwidth of a CRS subframe in which an additional CRS is transmitted and the additional CRS may be transmitted in the entire bandwidth.

Figure 30:
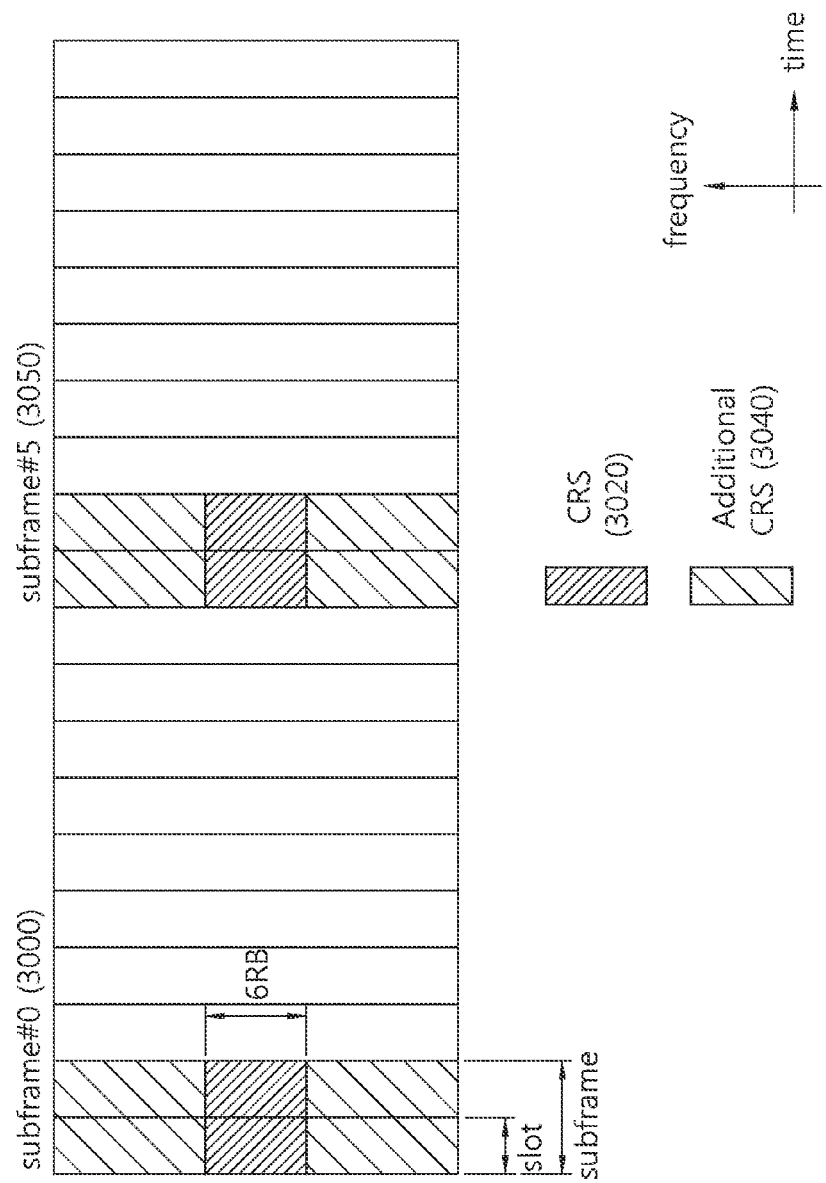
FIG. 30 is a conceptual diagram illustrating a method of sending an additional CRS in accordance with an embodiment of the present invention.

FIG. 30 is a conceptual diagram illustrating a method of sending an additional CRS in accordance with an embodiment of the present invention.

Referring to FIG. 30, in the configuration of a default CRS 3020, an NCT subframe may be generated so that CRSs are transmitted in the center 6 RB-bands of a subframe #0 3000 and a subframe #5 3050.

An additional CRS 3040 may be transmitted by increasing the transmission frequency bandwidth of the CRSs, transmitted in the center 6 RB-bands of the subframe #0 3000 and/or the subframe #5 3050, to the entire frequency bandwidth. If such a method is used, interference can be reduced using the additional CRS 3040 although frequency domains in which the CRSs are transmitted are overlapped when the default CRS 3020 is configured.

A region corresponding to the center 6 RBs of each of the subframe #0 3000 and the subframe #5 3050 is an example of regions in which CRSs are transmitted when the default CRS 3020 is configured, and another configuration of a default CRS may be used. A case where a CRS transmitted only in some frequency band of a CRS subframe is transmitted in the entire system bandwidth may be included in the scope of the present invention.

If such a method is used, the bandwidth of a CRS can be increased without changing the configuration of a CRS subframe.

In a similar method, as a method of sending an additional CRS, a frequency bandwidth in which a CRS is transmitted may be increased to 3 MHz, 5 MHz, 10 MHz, and 20 Mhz. If such a method is used, a frequency bandwidth in which an additional CRS is transmitted can be increased.

(2) A Method of Additionally Configuring a CRS Transmission Frequency Band of 6 RBs.

For example, if a CRS is assumed to be transmitted in a frequency band corresponding to center 6 RBs in the configuration of a default CRS, an additional 6 RB region may be configured as a frequency band in which an additional CRS is transmitted.

FIG. 31 is a conceptual diagram illustrating a method of sending an additional CRS in accordance with an embodiment of the present invention.

Referring to FIG. 31, a CRS may be transmitted in an additional frequency band corresponding to 6 RBs 3130 of the entire frequency band in addition to a frequency band corresponding to the center 6 RBs 3120 of each of a subframe #0 3100 and a subframe #5 3150.

FIG. 31(A) is a conceptual diagram illustrating a method of sending a CRS in a frequency band corresponding to the top 6 RBs 3130 in addition to the frequency band corresponding to the center 6 RBs 3120.

FIG. 31(B) is a conceptual diagram illustrating a method of sending a CRS in a frequency band corresponding to the bottom 6 RBs 3140 in addition to the frequency band corresponding to the center 6 RBs 3120.

(4) A Method of Increasing the Number of CRS Subframes.

In yet another method of sending an additional CRS, the number of CRS subframes in which a CRS is transmitted may be increased in a single frame. For example, additional CRSs may be transmitted using a method of additionally sending CRSs, transmitted only in the subframe #0 and the subframe #5, in the subframe #1 and the subframe #6.

The methods (1) to (3) of sending an additional CRS have been independently illustrated, but the methods (1) to (3) of sending an additional CRS may be combined and used to send additional CRSs. A method of indicating an additional CRS pattern is to use a bitmap. The bitmap may be indicative of an additional CRS configuration. If the $i^{th}$ bit of the bitmap is configured to be 1, an additional CRS corresponding to a configuration index i may be added to the configuration of a default CRS and used. The index indicative of the additional CRS configuration may be assumed that a CRS is transmitted at the center 6 RBs of the subframe #0 and the subframe #5. The following is indicative of a method of sending an additional CRS according to an index.

An index 1: a CRS is transmitted in the entire frequency bandwidth of the subframe #0

An index 2: a CRS is transmitted in the entire frequency bandwidth of the subframe #5

An index 3: an additional CRS is transmitted in an increased 3 MHz frequency bandwidth An index 4: an additional CRS is transmitted in an increased 5 MHz frequency bandwidth An index 5: an additional CRS is transmitted in an increased 10 MHz frequency bandwidth An index 6: an additional CRS is transmitted in an increased 20 MHz frequency bandwidth An index 7: an additional CRS is transmitted at the 6 RBs of each of PRB indices 0 to 5

An index 8: an additional CRS is transmitted at the 6 RBs of PRB indices $N_{RB}^{DL}-6$ to $N_{RB}^{DL}-1$ An index 9: an additional CRS is transmitted at the center 6 RBs of the subframe #1

An index 10: an additional CRS is transmitted at the center 6 RBs of the subframe #6

Figure 32:
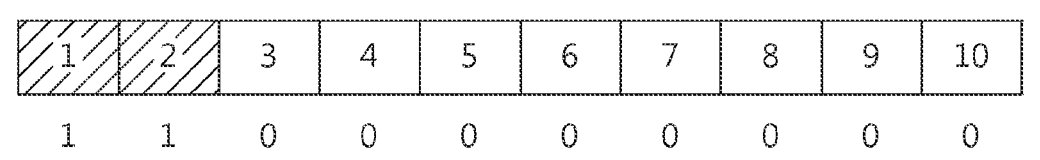

FIG. 32 is a conceptual diagram illustrating a bitmap in accordance with an embodiment of the present invention.

Referring to FIG. 32, a method of configuring an additional CRS may be selected using a bitmap.

For example, if a bitmap is {1, 1, 0, 0, 0, 0, 0, 0, 0, 0}, an additional CRS configuration corresponding to the index 1 and the index 2 may be applied to a CRS subframe. Accordingly, CRSs may be transmitted in the entire system bandwidth including center 6 RBs in the subframe #0 and the subframe #5.

The method of sending information about a additional CRS configuration using a bitmap in FIG. 24 is an example, and another method may be used to send information about an additional CRS configuration, and such an embodiment is also included in the scope of the present invention.

If a CRS is used to help the time and frequency tracking of UE, effective data demodulation may be performed based on a transmitted CRS. Broadcast data transmitted in a CSS may be demodulated using a CRS placed at center 6 RBs.

In the current LTE release 10 specification, a collision may occur because the region in which a DM-RS is transmitted is overlapped with the region in which a PSS/SSS is transmitted. The DM-RS may not be transmitted with respect to a resource region in which the DM-RS collides against the PSS/SSS. Accordingly, a CRS may be transmitted at the 6 RBs of the region in which the PSS/SSS is transmitted, and demodulation may be performed based on the CRS rather than the DM-RS.

That is, the demodulation of a PDCCH transmitted in the frequency band of a subframe in which a PSS/SSS is transmitted may be performed based on a CRS. If FDD is used as a duplexing method, a PSS/SSS is transmitted in the subframe #0/the subframe #5. If TDD is used as a duplexing method, a PSS/SSS is transmitted in the subframe #0-#1/the subframe #5-#6. In both TDD/FDD, the location where a PSS/SSS is transmitted may collide against the location where a DM-RS is transmitted in the subframe #0 and the subframe #5. Accordingly, demodulation based on a CRS rather than a DM-RS may be performed at the center 6 RBs of each of the subframe #0 and the subframe #5.

As described above with reference to FIG. 29, UE placed in the coverage of a plurality of NCT cells having the same center frequency may experience interference from time and frequency viewpoints. Interference generated in UE may be measured due to RRM measurement attributable to a serving eNB and a CSI report.

If interference is generated, an additional CRS may be added to the configuration of a default CRS and transmitted as described above. Information about the additional CRS configuration may be transmitted to each piece of UE through RRC signaling. For example, it may be assumed that an additional CRS is transmitted in a region corresponding to the 6 RBs of a PRB 0 to a PRB 5. In such a case, in order to avoid interference generated in the CRS transmitted at the center 6 RBs, UE may perform tracking from frequency and time viewpoints using the additional CRS transmitted in the region corresponding to the 6 RBs of the PRB 0 to PRB 5. In another method of configuring an additional CRS, UE may calculate the intensity of a measured reference signal, may calculate the amount of interference, and may determine the reference time/frequency location of a received CRS. In both the methods, information about a CRS configuration may be determined through higher layer signaling.

A CRS configuration used by each cell may be exchanged between neighboring cells. Accordingly, the location of a frequency band for performing RRM measurement on a neighboring cell may be set. In order to perform more precise RRM measurement aimed at handover, a serving cell may notify a target cell of information about the location of a CRS subband where a lot of interference is generated. UE may be avoided to attempt RRM measurement on a subband having severe interference based on such information. If UE performs RRM measurement on a subband having severe interference, the detection of a PSS/SSS/CRS may fail or an RRM measurement result of low quality may occur. Delay occurring in a step of obtaining channel information can be reduced if channel measurement is not performed on a subband having severe interference.

That is, a serving cell may compute information about a frequency band having severe interference based on a frequency used by a neighboring cell and may send such information to UE. For example, referring back to FIG. 29, it may be assumed that the UE2 2920 performs handover from the pico 2 2930 to the pico 3 2950. In such a case, the eNB of the pico 2 2930 may notify the UE that severe interference may occur in center 6 RBs in the pico 3 2950.

Figure 33:
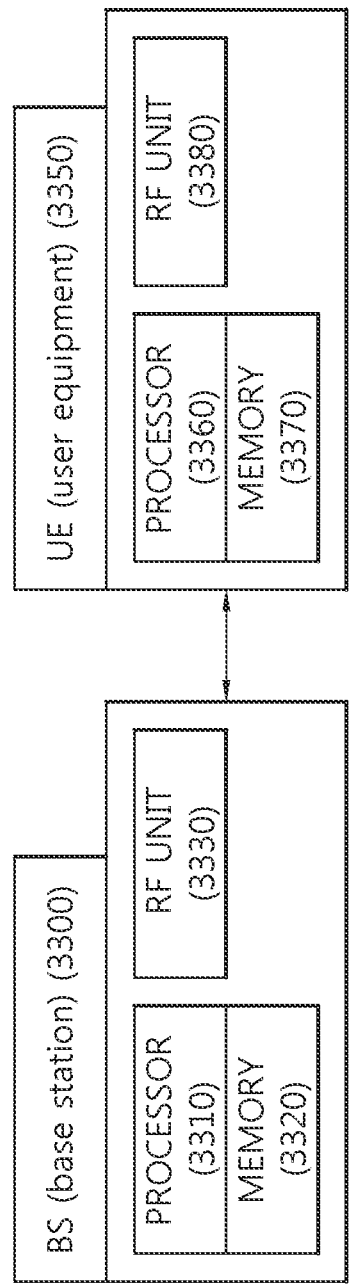
FIG. 33 is a block diagram illustrating a wireless communication system in accordance with an embodiment of the present invention.

FIG. 33 is a block diagram illustrating a wireless communication system in accordance with an embodiment of the present invention.

Referring to FIG. 33, a BS 3300 includes a processor 3310, memory 3320, and a Radio Frequency (RF) unit 3330. The memory 3320 is connected to the processor 3310 and stores a variety of pieces of information for driving the processor 3310. The RF unit 3330 is connected to the processor 3310 and sends and/or receives radio signals. The processor 3310 implements the proposed functions, processes and/or methods. In the aforementioned embodiments, the operation of the BS may be implemented by the processor 3310.

For example, the processor 3310 may differently determine the locations of OFDM symbols in which a PSS and an SSS are transmitted depending on a CRS configuration.

A wireless device 3350 includes a processor 3360, memory 3370, and an RF unit 3380. The memory 3370 is connected to the processor 3360 and stores a variety of pieces of information for driving the processor 3360. The RF unit 3380 is connected to the processor 3360 and sends and/or receives radio signals. The processor 3360 implements the proposed functions, processes and/or methods. In the aforementioned embodiments, the operation of the BS may be implemented by the processor 3360.

For example, the processor 3360 may obtain information about a CRS configuration depending on the locations of OFDM symbols in which a PSS and an SSS are transmitted.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A cell search method, comprising:
receiving a Primary Synchronization Signal (PSS) transmitted in a first Orthogonal Frequency Division Multiplexing (OFDM) symbol;
receiving a Secondary Synchronization Signal (SSS) transmitted in a second OFDM symbol;
calculating a difference value between a symbol number of the first OFDM symbol and a symbol number of the second OFDM symbol; and
searching for the Cell-specific Reference Signal (CRS) based on the difference value,
wherein the CRS is transmitted only in a frequency band corresponding to 6 Resource Blocks (RBs) when using a center frequency of an entire frequency band, and
wherein the CRS is a reference signal generated based on a cell ID.

2. The cell search method of claim 1,
wherein if the CRS is not transmitted in the frequency band corresponding to 6 RBs, the CRS is transmitted only in a frequency band corresponding to a Physical Resource Block 0 (PRB 0) to a Physical Resource Block 5 (PRB 5) of the entire frequency band.

3. The cell search method of claim 1,
wherein if the CRS is not transmitted in the frequency band corresponding to 6 RBs, the CRS is transmitted only in a frequency band corresponding to $N_{RB}^{DL}-6 \sim N_{RB}^{DL}-1$ (wherein, $N_{RB}^{DL}$ is a number of resource blocks included in an entire bandwidth) of the entire frequency band.

4. The cell search method of claim 1,
wherein if the CRS is not transmitted in the frequency band corresponding to 6 RBs, the CRS is transmitted only in a frequency band corresponding to 6 Resource Blocks (RBs) based on a center frequency of the entire frequency band of a subframe #0 and a subframe #5, and
wherein the subframe #0 is a subframe placed at a first position in a time axis in a single frame, and the subframe #5 is a subframe placed at a sixth position in the time axis in the single frame.

5. The cell search method of claim 1,
wherein if the CRS is not transmitted in the frequency band corresponding to 6 RBs, the CRS is transmitted in the entire frequency band of each of a subframe #0 and a subframe #5, and
wherein the subframe #0 is a subframe placed at a first position in a time axis in a single frame, and the subframe #5 is a subframe placed at a sixth position in the time axis in the single frame.

6. A wireless device, comprising:
a processor configured to:
search for a Cell-specific Reference Signal (CRS) based on a symbol number of a first Orthogonal Frequency Division Multiplexing (OFDM) symbol in which a Primary Synchronization Signal (PSS) is transmitted and a symbol number of a second OFDM symbol in which a Secondary Synchronization Signal (SSS) is transmitted; and
calculate a difference value between the symbol number of the first OFDM symbol and the symbol number of the second OFDM symbol,
wherein the processor searches for the CRS based on the difference value,
wherein the CRS is transmitted only in a frequency band corresponding to 6 Resource Blocks (RBs) when using a center frequency of an entire frequency band, and
wherein the CRS is a reference signal generated based on a cell ID.

7. The wireless device of claim 6,
wherein if the CRS is not transmitted in the frequency band corresponding to 6 RBs, the CRS is transmitted only in a frequency band corresponding to a Physical Resource Block 0 (PRB 0) to a Physical Resource Block 5 (PRB 5) of the entire frequency band.

8. The wireless device of claim 6,
wherein if the CRS is not transmitted in the frequency band corresponding to 6 RBs, the CRS is transmitted only in a frequency band corresponding to $N_{RB}^{DL}-6 \sim N_{RB}^{DL}-1$ (wherein, $N_{RB}^{DL}$ is a number of resource blocks included in an entire bandwidth) of the entire frequency band.

9. The wireless device of claim 6,
wherein if the CRS is not transmitted in the frequency band corresponding to 6 RBs, the CRS is transmitted only in a frequency band corresponding to 6 Resource Blocks (RBs) based on a center frequency of the entire frequency band of a subframe #0 and a subframe #5, and
wherein the subframe #0 is a subframe placed at a first position in a time axis in a single frame, and the subframe #5 is a subframe placed at a sixth position in the time axis in the single frame.

10. The wireless device of claim 6,
wherein if the CRS is not transmitted in the frequency band corresponding to 6 RBs, the CRS is transmitted in the entire frequency band of each of a subframe #0 and a subframe #5, and
wherein the subframe #0 is a subframe placed at a first position in a time axis in a single frame, and the subframe #5 is a subframe placed at a sixth position in the time axis in the single frame.

11. A wireless device, comprising:
a receiver configured to receive a Primary Synchronization Signal (PSS) transmitted in a first Orthogonal Frequency Division Multiplexing (OFDM) symbol and a Secondary Synchronization Signal (SSS) transmitted in a second OFDM symbol; and
a processor operably coupled to the receiver,
wherein the processor is configured to:
calculate a difference value between a symbol number of the first OFDM symbol and a symbol number of the second OFDM symbol; and
search for a Cell-specific Reference Signal (CRS) based on the difference value,
wherein the CRS is transmitted only in a frequency band corresponding to 6 Resource Blocks (RBs) when using a center frequency of an entire frequency band, and
wherein the CRS is a reference signal generated based on a cell ID.

* * * * *